(12) United States Patent
Poulsen

(10) Patent No.: US 11,947,479 B2
(45) Date of Patent: Apr. 2, 2024

(54) DYNAMIC TIMING CALIBRATION SYSTEMS AND METHODS

(71) Applicant: Google LLC, Mountain View, CA (US)

(72) Inventor: Jens Kristian Poulsen, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/139,688

(22) Filed: Apr. 26, 2023

(65) Prior Publication Data

US 2023/0259473 A1 Aug. 17, 2023

Related U.S. Application Data

(63) Continuation of application No. 17/068,766, filed on Oct. 12, 2020, now Pat. No. 11,657,010, which is a continuation-in-part of application No. 16/455,625, filed on Jun. 27, 2019, now Pat. No. 11,294,837.

(60) Provisional application No. 62/914,351, filed on Oct. 11, 2019, provisional application No. 62/853,654, filed on May 28, 2019, provisional application No. 62/824,985, filed on Mar. 27, 2019, provisional application No. 62/791,607, filed on Jan. 11, 2019, provisional application No. 62/721,412, filed on Aug. 22, 2018.

(51) Int. Cl.
*G06F 13/362* (2006.01)
*G06F 1/12* (2006.01)
*G06F 13/40* (2006.01)
*G06F 13/42* (2006.01)
*H04L 7/00* (2006.01)

(52) U.S. Cl.
CPC ............ *G06F 13/3625* (2013.01); *G06F 1/12* (2013.01); *G06F 13/4004* (2013.01); *G06F 13/423* (2013.01); *H04L 7/0037* (2013.01)

(58) Field of Classification Search
CPC ............. G06F 13/3625; G06F 13/4004; G06F 13/423; G06F 1/12; H04L 7/0073
See application file for complete search history.

(56) References Cited

U.S. PATENT DOCUMENTS 5,374,860 A * 12/1994 Llewellyn .............. H03K 5/131
327/261
5,742,798 A 4/1998 Goldrian
(Continued)

OTHER PUBLICATIONS

International Search Report and Written Opinion for PCT/US2021/054552 dated Jan. 27, 2022, all pages.
(Continued)

*Primary Examiner* — Phong H Dang
(74) *Attorney, Agent, or Firm* — Kilpatrick Townsend & Stockton LLP

(57) ABSTRACT

Provided herein are systems and methods for performing dynamic adaption and correction for internal delays in devices connected to a common time-multiplexed bus. The methods allow devices to operate reliably at a higher bus frequency by correcting for inherent and unknown delays within the components and in the system by measuring the actual delays using multiple readings with the bus. Intrinsic noise and jitter are used to increase the precision of the measurements, thereby essentially using these uncertainties as self-dithering for increased measurement resolution. During adaption, delays may be adjusted in multiple step sizes to speed adaption time.

20 Claims, 25 Drawing Sheets

(56) References Cited

U.S. PATENT DOCUMENTS

| | | |
|---|---|---|
| 7,382,844 B2 | 6/2008 | Hwang et al. |
| 8,067,948 B2 | 11/2011 | Sequine |
| 8,775,707 B2 | 7/2014 | Poulsen |
| 8,825,497 B2 | 9/2014 | Poulsen |
| 9,032,131 B2 | 5/2015 | Poulsen |
| 9,235,294 B2 | 1/2016 | Poulsen |
| 9,252,900 B2 | 2/2016 | Poulsen |
| 9,424,849 B2 | 8/2016 | Lesso et al. |
| 9,461,812 B2 | 10/2016 | Poulsen |
| 9,473,876 B2 | 10/2016 | Poulsen |
| 9,479,275 B2 | 10/2016 | Poulsen |
| 9,558,731 B2 | 1/2017 | Poulsen |
| 9,672,177 B2 | 6/2017 | Poulsen |
| 9,798,684 B2 | 10/2017 | Poulsen |
| 10,734,012 B2 | 8/2020 | Poulsen |
| 11,294,837 B2 | 4/2022 | Poulsen |
| 2002/0105933 A1 | 8/2002 | Higuchi |
| 2002/0116468 A1 | 8/2002 | Ishikawa |
| 2004/0187044 A1 | 9/2004 | Barman et al. |
| 2007/0200942 A1* | 8/2007 | Xu .................. H04N 25/745 348/E5.079 |
| 2008/0080261 A1 | 4/2008 | Shaeffer et al. |
| 2009/0110004 A1* | 4/2009 | Chou ................ H04B 10/5165 370/478 |
| 2009/0160520 A1* | 6/2009 | Matsunami .............. H03K 7/08 327/276 |
| 2009/0295438 A1 | 12/2009 | Jammula et al. |
| 2009/0327789 A1 | 12/2009 | Zerbe et al. |
| 2010/0158037 A1 | 6/2010 | Heinke et al. |
| 2010/0327934 A1* | 12/2010 | Kapusta ................ H03K 5/133 327/284 |
| 2013/0322462 A1 | 12/2013 | Poulsen |
| 2014/0281079 A1 | 9/2014 | Biskup |
| 2016/0028576 A1 | 1/2016 | Pei et al. |
| 2016/0191184 A1 | 6/2016 | Hsueh et al. |
| 2017/0141865 A1 | 5/2017 | Ha et al. |
| 2018/0357194 A1 | 12/2018 | Ulmer et al. |
| 2019/0074026 A1* | 3/2019 | Poulsen ................ G10L 21/055 |
| 2020/0065277 A1 | 2/2020 | Poulsen |
| 2020/0389244 A1 | 12/2020 | Furtner |

OTHER PUBLICATIONS

White RV, Freeman D. Data communications issues for power system management. InAPEC 07—Twenty-Second Annual IEEE Applied Power Electronics Conference and Exposition 2007 (pp. 1188-1199). IEEE.

* cited by examiner

DYNAMIC TIMING CALIBRATION SYSTEMS AND METHODS

CROSS-REFERENCE TO RELATED APPLICATIONS

The present application is a continuation of U.S. patent application Ser. No. 17/068,766, filed Oct. 12, 2020, which claims the benefit of and priority to U.S. Provisional Patent Application No. 62/914,351, filed Oct. 11, 2019, which are incorporated herein by reference in its entirety.

U.S. patent application Ser. No. 17/068,766 is also a continuation-in-part of U.S. patent application Ser. No. 16/455,625, filed Jun. 27, 2019, which is incorporated herein by reference in its entirety. U.S. patent application Ser. No. 16/455,625 claims the benefit of and priority to U.S. Provisional Patent Application No. 62/721,412, filed Aug. 22, 2018; U.S. Provisional Patent Application No. 62/791,607, filed Jan. 11, 2019; U.S. Provisional Patent Application No. 62/824,985, filed Mar. 27, 2019; and U.S. Provisional Patent Application No. 62/853,654, filed May 28, 2019; each of which is incorporated herein by reference in its entirety.

The present application is also related to U.S. Provisional Patent Application No. 62/895,449, filed Sep. 3, 2019 and entitled "Dynamic Timing Calibration Systems and Methods," which is incorporated herein by reference in its entirety.

TECHNICAL FIELD

The present application relates generally to systems and methods for synchronization between multiple devices attached to a common bus utilizing time-multiplexing of data and clock information on a common line.

BACKGROUND

Many modern communication systems enable the transfer of data between two or more connected devices (e.g., a headphone and a host processing system) through a bus system. To save pin-count and for physical constraint considerations, it is often an advantage to combine two or more signals on a common bus to enable the sharing of signals between the devices. When these signals are time-multiplexed, the individual devices use a common source of synchronization, which is typically provided by a clock line and a frame start marker to identify the start of data.

The device coupled to a bus that sends out clock and frame start information will be referred to herein as the master device and receivers of this information will be referred to herein as the slave devices. The source of the clock and frame start could be another device, and/or a sub-circuit could provide this information to the bus for all to use. Assuming the master device conveys information to the slave devices, then it is common to receive data at high speed from the master device by the slave devices, because the clock and data will incur equal delays in the system. However, depending on internal propagation delays in the circuits involved and external delays such as determined by the bus diameter and physical parameters of this bus system, there may be a large uncertainty in the arrival time of signals being propagated from a slave device and received at the master device. If the transmission speed is low, this is not a problem, but for high speed links this uncertainty results in a diminishing size of the receiver eye opening resulting in either poor signal quality or complete transmission failure at higher transmission speeds.

It is possible to some degree to alleviate the problem by the manufacture of very high precision circuits with associated increase in production cost and silicon area and/or the trimming of individual parts, which also add to the production cost. Even with efforts to reduce this variability from the delays of individual parts, there are still variations due to process, voltage, and temperature (PVT). Therefore, while it is possible to increase transmission speeds by precise design and trimming, any PVT variations will significantly limit the performance at higher speeds.

In view of the foregoing, there is a continued need in the art for low cost, low power bus systems that facilitate high speed communications between connected devices.

SUMMARY

The present disclosure discloses bus systems and methods that include an automatic adjustment procedure to enable devices to self-calibrate. The approaches disclosed herein enable the production of low cost devices due to the elimination of precision trimming or precision circuits inside these devices.

In various embodiments, a method includes controlling a bus to facilitate communications between a plurality of devices, wherein the communications are synchronized based at least in part on a time-multiplexed clock and data protocol, initializing the bus to a first value using a first device, receiving a second value, different than the first value, on the bus from a second device, and transmitting a response to the second device based at least in part on the second value to the second device, the response configured to control a delay of the second device to calibrate communications on the bus from the second device.

The method may further include estimating, by the first device, the delay of the second device, and adjusting the delay of the second device to cause a fluctuation of the value read by the first device. In some embodiments, the method includes reading back the second value written by the second device before the second value is settled on the bus. The second value may be written by the second device a plurality of times and the first device may filter the readings to reduce a variability of the estimate of a current read back value on the bus. The first device may generate a command requesting one or more devices coupled to the bus to respond with a reply and adjusting delays to the devices based at least in part on the replies, wherein the replies comprise multiple replies from each responding device. The method may include adjusting the average of the value read from the bus to have a probability between zero and one and adjusting delays accordingly to avoid reading back the same value.

In some embodiments, the method further includes providing a bus holder in a bus circuit configured to suppress leakage currents that could cause an undefined state, wherein the bus holder maintains a current state of the bus when undriven.

The method may further include providing a first settling mode to obtain an estimate of a correct delay position using first delay steps during an initial correction, and providing a second settling mode to obtain a more precise delay position for a final adjustment of the delay, the second settling mode using second delay steps that are smaller than the first delay steps and settling slower than the first settling mode, and switching between the first and second settling modes based on multiple read back values. Switching between the first and second settling modes may further include switching to the first settling mode when there has not been a change in the value over N reads, and switching to the second settling mode, when there have been one or more changes in values over N reads. The method may further comprise providing an adaptive mode with multiple adaption speeds, determining whether a value being read back is equal to a previous value and increasing the adaption speed up to a certain upper limit, and determining whether a value being read back is different than a previous value and decreasing the adaption speed to a certain lower limit.

In various embodiments, a system includes a first device coupled to a bus, the first device configured to control the bus to synchronize communications between a plurality of devices based at least in part on a time-multiplexed clock and data protocol, and initialize the bus to a first value, and a second device communicably coupled to the bus, the second device configured to transmit a second value, different than the first value, on the bus. The first device may be configured to read the second value from the bus and transmit a response based at least in part on the second value to the second device, and the response may be configured to control the delay of the second device to calibrate communications on the bus from the second device. The system may be configured to include a limit for a plurality of delay values calculated that will be aligned with the actual hardware values.

In some embodiments the first device is configured to adjust the delay of the second device such that the value that is being read by the first device will fluctuate between two or more values. The first device may further be configured to read the value written by the second device a plurality of times and perform a filtering of these values; wherein the filters are configured to reduce variability of the estimate of a current read back value on the bus. The first device may be configured to set the bus to a known value and then leave the bus undriven by disabling an output driver after which a second device can change a state of the bus.

The bus may comprise a circuit including a bus holder configured to eliminate problems with leakage currents that could result in an undefined state, wherein the bus holder maintains a current state of the bus when undriven.

In some embodiments, the first device is configured to write an initial delay value into a plurality of connected devices before they are configured to drive the bus, and wherein the initial delay value is a previous delay value from last time the system was operating as an initial value for updating the other connected devices. The system may be further configured to adjust the average of the value read from the bus to have a probability between zero and one and adjust delays accordingly and avoid reading back the same value.

The system may be configured to include a first settling mode for use during an adjustment of delays to obtain an estimate of a correct delay position and a second settling mode configured to determine a more precise delay position for a final adjustment of the delay, the second settling more having smaller delay steps during a subsequent correction than the first settling mode. The system may be further configured to switch between the first and second settling modes based on multiple read back values.

The system may be further configured to include an adaptive mode with multiple adaption speeds, wherein when a value read back is the same as a previous value, the adaption speed is incrementally increased up to certain upper limit, and when a value read back is different than a previous value, the adaption speed is decremented to a certain lower limit.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
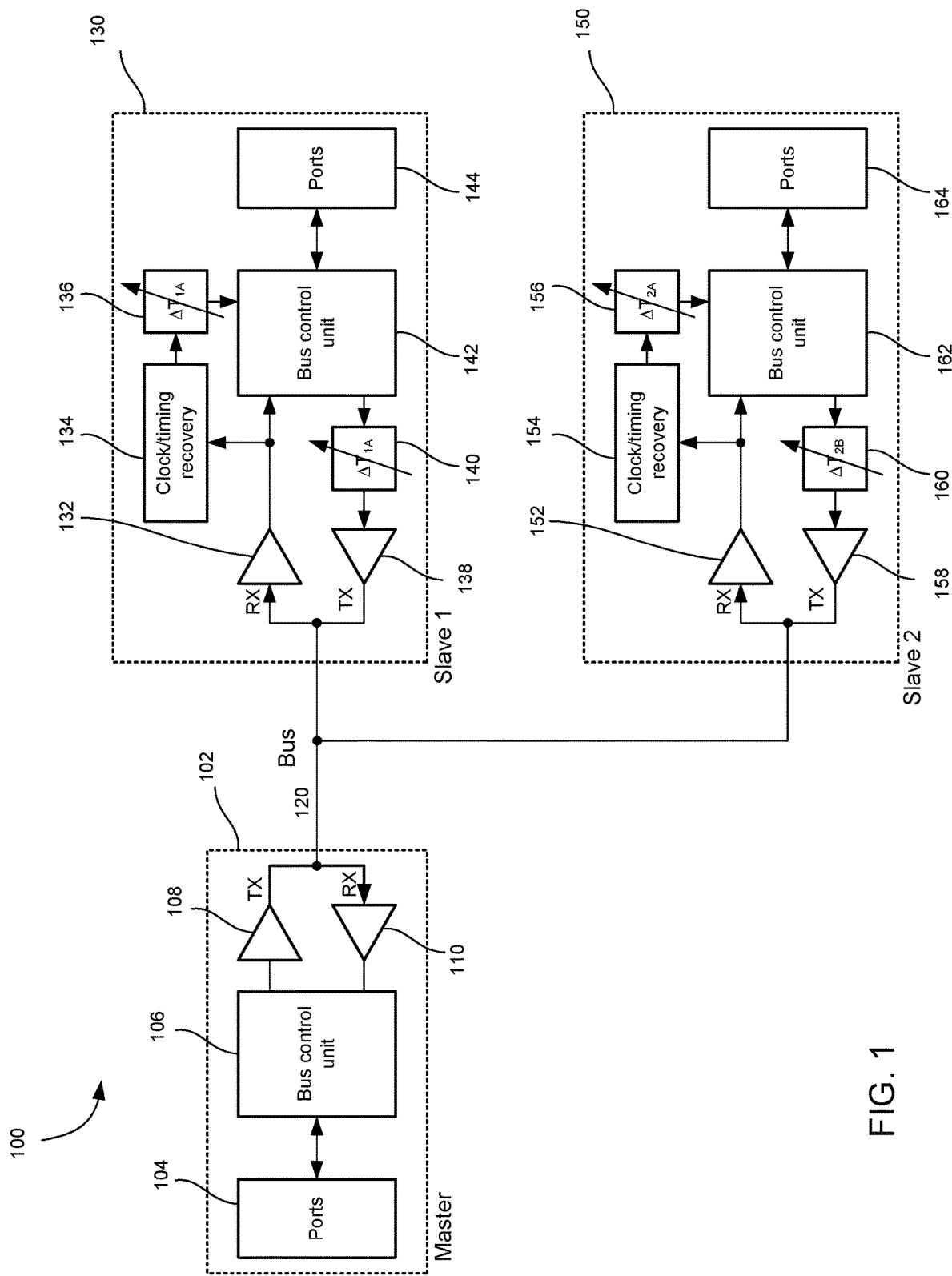
FIG. 1 is a block diagram illustrating a master device and two slave devices connected to a common bus, with delays inside the devices and on the bus itself, in accordance with one or more embodiments of the present disclosure.

In accordance with various embodiments of the present disclosure, systems and methods for achieving synchronization between multiple devices connected to a common bus, where clock and data information is combined, are described.

For synchronization between multiple devices connected to a bus system, one device will send out a synchronization pattern which is received by other devices connected to the same bus system and used as a time reference. The internal delays inside these other devices connected to the bus may be unknown. Embodiments disclosed herein include system and methods for calibration of the delays between the time reference and the individual devices.

A method for self-calibration is described herein that enables the individual devices to perform the time-adjustment by themselves, based on data written by these devices to the bus and replicated by the device that provides the time reference. In this context the device that provides a time reference will be called the master device, while the devices that try to correct their own timing will be called slave devices. In various embodiments, a procedure to perform the calibration will include the following: (i) the master device sends out a time reference (e.g., a synchronization pattern) onto which the slave devices can lock; and (ii) based on the information, these slave devices may be able to read information from the master device to the slave devices, because both the synchronization pattern and any commands from the master device will incur the same delays, and therefore are able to be received reliably.

However, the delays from a slave device to the master device is unknown until this has been measured and therefore, to facilitate fast bus operation and avoid bus collisions, the bus is configured to optimize the timing of the transmission of data from a slave device to a master device. In some embodiments, this problem will be solved by letting the slave device write a value to the master device, and this value will be changing the current value of the bus state and the master device will the write the value it has read to the bus for the slave device to use as an indicator of the internal delays.

The slave device is configured to adjust the internal delays, based on the value that has been read back from the master device. For example, the value that has been read back approaches a certain probability e.g., 50% of zeros and ones thereby indicating that this particular delay value will result in the opening of the slave device transmitter at the optimal time and from this the master device may be able to reliably read the value from the master device one time unit later, where one time unit is defined by the time reference for the clock system.

While the methods described herein will be shown with examples on single-ended bus systems, similar methods may be applied to differential buses, where both the master device and the slave device will contain differential transmitter and receiver circuits.

Components of a system 100 for performing bus communication between multiple components attached to a bus 120 utilizing time-multiplexed communication with an embedded clock delay adjustment of devices, will now be describe with reference to FIG. 1. The system 100 includes at least one master device 102 that may include ports 104 for external or internal communication, a bus control unit 106, a transmitter output port 108 connected to the common bus and a receiver input port 110 also connected to the common port. The master device may include a clock generation circuit or external clock source (not shown), but this could be placed in other parts of the system.

The bus system may include one or more slave devices, like Slave 1, 130. This device will include a receiver input port 132, a clock or timing recovery circuit 134, an optional input time adjustment circuit 136, an output transmitter port 138, an output timing adjustment circuit 140, a bus control circuit 142 and various ports 144 for communication. In addition to Slave 1, there is shown a similar device, Slave 2, 150, with similar circuits (e.g., receiver input port 152, a clock or timing recovery circuitry 154, an optional input time adjustment circuit 156, an output transmitter port 158, an output timing adjustment circuit 160, a bus control circuit 162 and various ports 164 for communication), though the two devices may not be identical, nor are both devices required to be attached to the bus. In some embodiments, multiple devices are located on the bus in addition to Slave 1 and 2. The slave devices may use, for example, a DLL (delay-locked loop) or a PLL (Phase locked loop) for synchronization to the master device synchronization information. In some cases, these sub-circuits may include a time-gate to remove any random data on the bus to interfering with the operation of the PLL and DLL circuits. This time-gate (not shown) may first be employed after the slave device has obtained lock to the bus.

Any clock and data signals from the master device to an attached slave device will incur the same delay. Therefore, a slave device may use the clock reference as a stable timing to recover any data. However, the internal delays in both the master device and slave device are unknown and there are unknown external factors such as the bus delay. Therefore, there will be significant uncertainty with respect to the arrival of data in the direction from a slave device to the master device. To optimize this timing a procedure to obtain very accurate delay calibration at low cost will be described. The procedure will not require the addition of additional special circuits to the system. Factors like jitter and noise that are normally considered detrimental to the system operation will here be used to improve the timing resolution of the system, thereby enabling a master device and slave device to obtain accurate timing information even though only two voltage levels are used in the transmission and reception of information. The large jitter associated with a very low power system will result in a variability in the value of the received sampled near the transition point, but this variability will be used constructively to improve the timing estimates of the total path delays. It is possible to adjust the reception of the data inside the master device, but for highest possible bandwidth it may be better to adjust the actual transmission events inside the one or more attached slave devices. This way, any data from the slave devices can be tightly aligned for highest possible bandwidth on the bus system.

The range of delay adjustment needed will depend on component tolerances, bus diameter and internal delays governed by specific technology considerations. As an example, it is currently feasible to manufacture a slave device receiver circuit with a variation in the output settling point as compared to the input edge to +5 nanoseconds (ns) (internal delays) and +/−10 ns for a total variation of −5 ns to +15 ns (static delays, jitter not included).

The master device includes its own timing reference and in some contemplated implementations, variations within this device may be in the range −1 to +5 ns. For a bus diameter between 0 and 200 cm (e.g., a relatively long bus system), we will get a delay between 0 to 12 ns (assuming a slow propagation speed of about 16 cm/ns). The total variation of these factors results in a total timing variation of between −6 to 32 ns. To obtain a high speed, low power signaling system it is desirable to limit the number of clock transitions, but this will increase jitter in the slave device receiver circuit.

It is desirable to properly align the slave device data position irrespective of manufacturing tolerances for cost and system considerations. For the lowest possible power consumption, the jitter in the receiver clock recovery circuits will increase, therefore, it is desirable to limit the loss of bandwidth due to poor alignment of master device and slave device data patterns. For rms jitter in the order of 0.3 to 1.5 ns (realistic values), we will have a worst-case variation of +/−2.1 to 10.5 ns (factor 7 for an error probability of $10^{-12}$) in many implementations.

For the calibration to be considered successful, in some embodiments it is desirable that the slave device data is to be aligned within 1-2 ns of the optimal values for this factor to be a small fraction of the total error budget. This value may be so small, that it is not realistic to program or control this by a one-time factory programming. Therefore, embodiments are described herein to dynamically measure and control the delays inside the devices for optimal timing control.

The control of the slave device delay timing can happen either in the master device or in the slave device or in another device connected to the bus or the components in another way. An advantage of the master device controlling the timing is that all slave devices will not need the control circuit, so a single circuit can control all devices for a possible simpler system. However, it is also possible for a slave device to control its own timing, provided it knows what value the master device has read from it.

One way this can be solved is by letting the master device write back the value it has read from the slave device during a calibration phase. The advantage over the previous method is that the master device only needs to write back a single bit, which allows for a lowering of the bandwidth requirements during the calibration phase. The slave device itself can be entirely responsible for the calibration and will not need to rely on any special characteristics of the control algorithm situated inside the master device. Alternatively, the master device may signal the slave device to adjust its internal delay (e.g., no change of delay, increase delay or decrease delay) instead of providing an absolute delay control value to the slave device.

Figure 2:
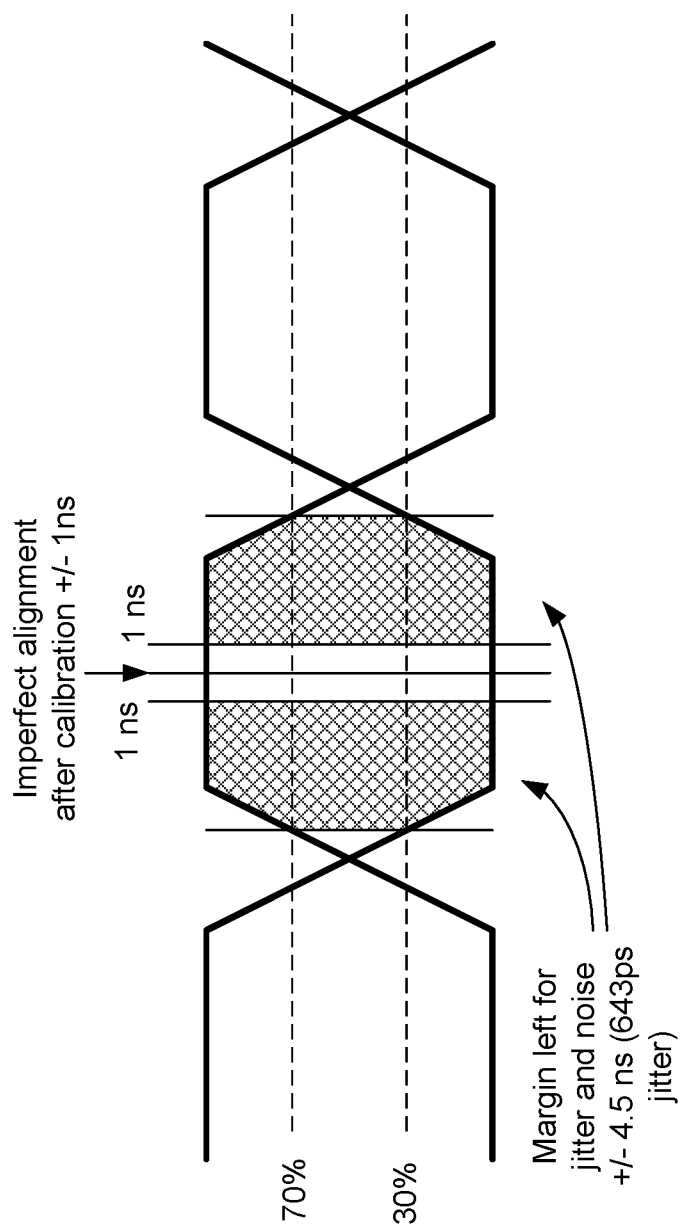
FIG. 2 is an eye diagram for a calibrated slave device, in accordance with one or more embodiments of the present disclosure.

FIG. 2 shows an eye diagram of data transmitted by a slave device that is operating at a relatively high frequency (e.g., 75 MHz) and using a delay adjustment that is accurate within +/−1 ns. It can be seen from the figure that there are left +/−4.5 ns for noise jitter and noise for the entire system and the data will still be readable. This is equivalent to 643 picoseconds (ps) of jitter root mean square (rms), for an error probability of 1012. Without adjustment and using the earlier values of adjustment needed in the range of −10 to +30 ns, the data would be randomly scattered across the eye openings.

FIGS. 3A-D show embodiments of the events involved in the sampling of delay information from a slave device to a master device. Looking at FIG. 3A, this shows the events involved in measuring the system delays. First the master device sends out a low-high transition to signal the start of a synchronization event. Then the master device will leave the bus floating after which a slave device can change the level of the bus. Finally, based on the time it takes before the bus changes again (in this instance from high to low) is an indication of the system delays (i.e., from master device to slave device to master device). Optionally and not shown on the figure, the master device may send out a copy of the value it has read from the bus either in the same frame or row or in a later row or frame in case the slave device is to perform any delay adjustment itself without any other interaction from the master device. The timing diagram is shown from the master device's point of view. A bus holder may be included in the system, to keep the bus value constant when no device is driving the bus. The output impedance of the bus holder will may be significantly higher than the impedance of the bus (transmission line) and significantly higher than the output impedance of the individual output drivers. The bus holder may be located in one or multiple components or may not be needed at all for systems that have small leakage currents and high operating frequencies.

Figure 3A:
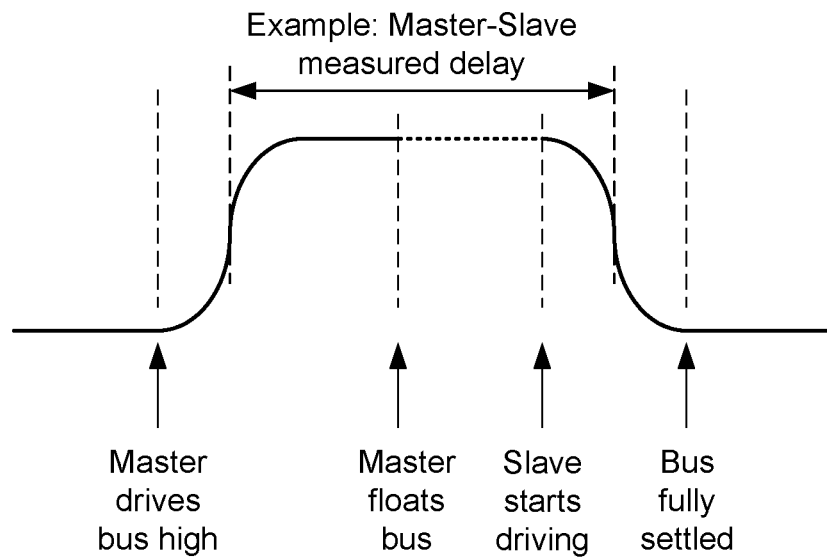
FIGS. 3A, 3B, 3C, and 3D are timing diagrams illustrating timing information from a slave device, in accordance with one or more embodiments of the present disclosure.
Figure 3B:
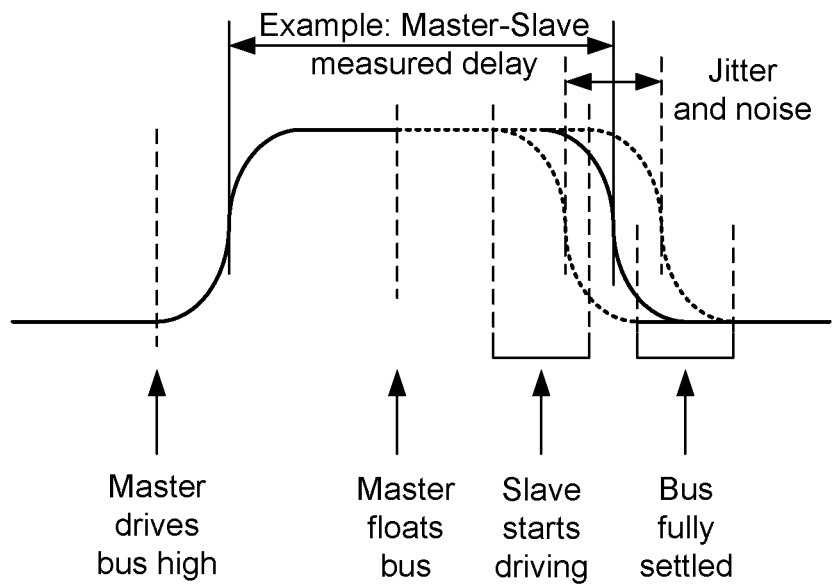

Looking at FIG. 3B, there is some uncertainty in the exact time when the bus changes level after the master device has left the bus idle. This uncertainty is mostly caused by jitter from the slave device clock recovery circuit. While there will also be a little bit of uncertainty in the exact master device timing, this timing will be much more stable due to the direct connection to a reference clock.

Figure 3C:
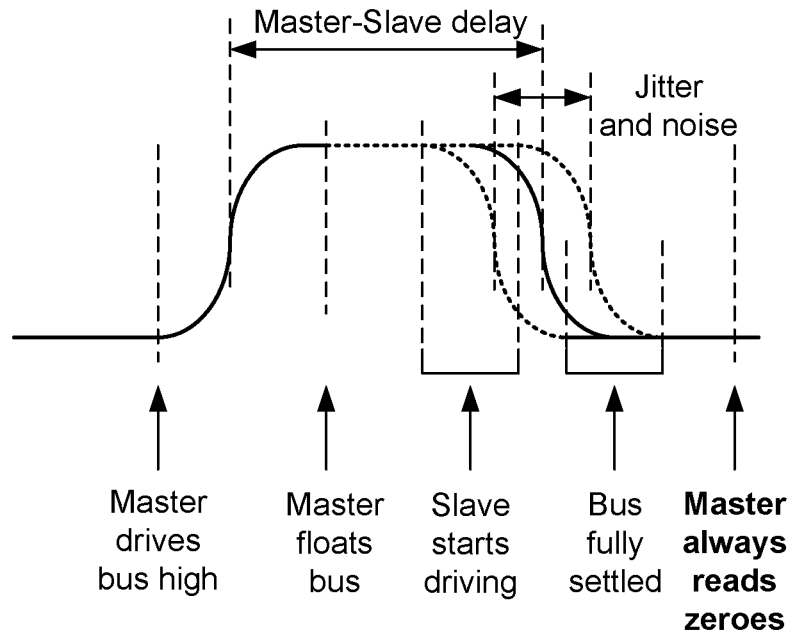

Looking at FIG. 3C, if the master device reads the bus value significantly later after the slave device has altered the bus value, the value read will always be the same. In the case shown on the figure, the master device will always read a low value or zero's. This is an indication that the delay value that has been set inside the slave device is too low because it may occupy more bandwidth than is really needed for correct operation.

Figure 3D:
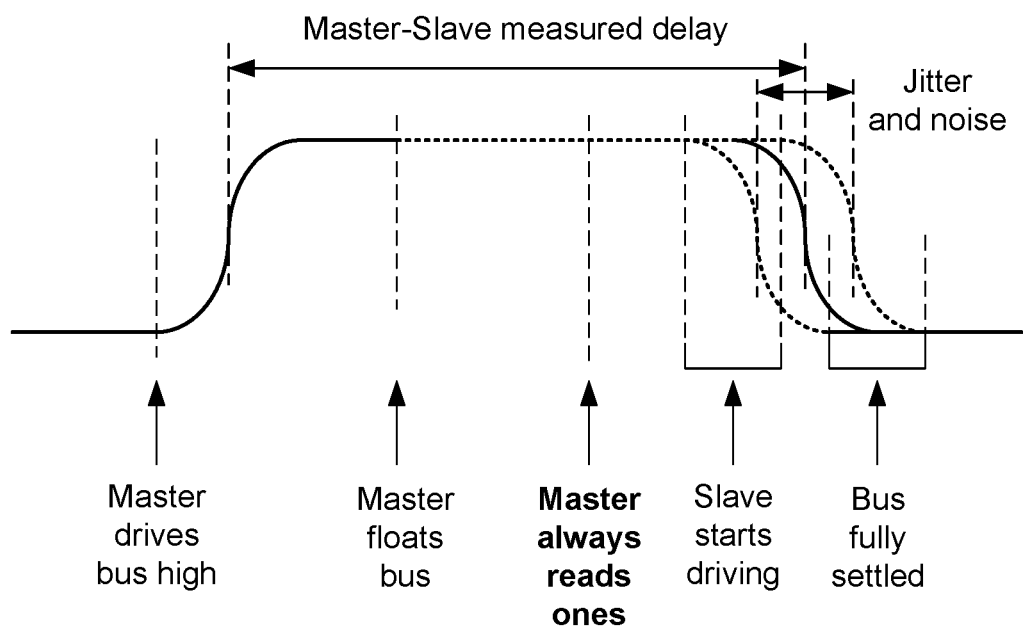

Looking at FIG. 3D, if the master device reads the bus value significantly earlier than the time at which the slave device changes the bus value, it will read the same value all the time. In this case, the master device will always read high or one's. This is an indication that the delay value has been set as too large, because the master device is not able to receive any information from the slave device at this time-slot.

Figure 4:
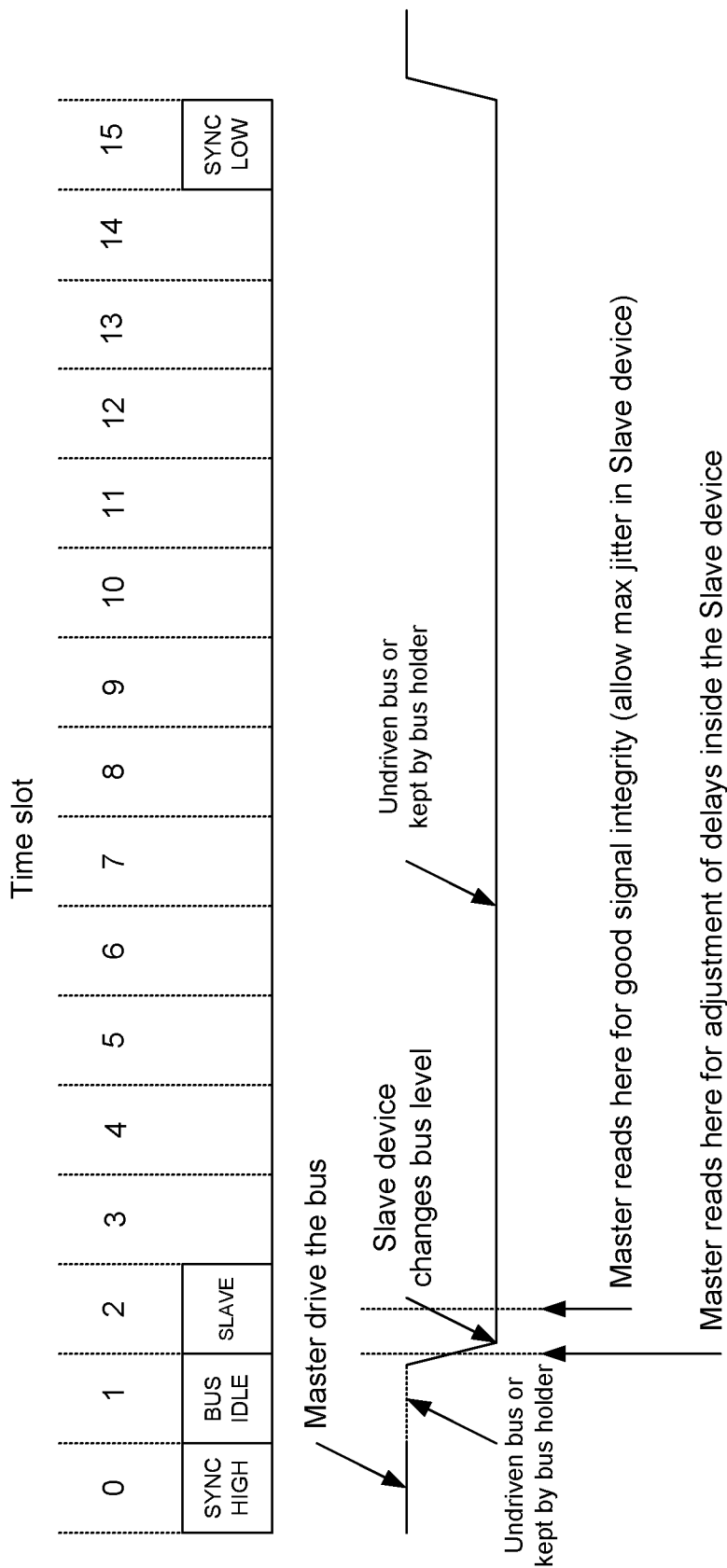
FIG. 4 illustrates time slots of an example time-multiplexed bus system with sixteen time slots in a row, including two time-slots for timing information, in accordance with one or more embodiments of the present disclosure.

FIG. 4 shows an embodiment of a time-multiplexed system containing 16 time-slots in each row. Each row also uses two time-slots to convey synchronization information from the master device to the slave device. All the other time-slots may be used for transferring data between the master device and the slave devices or for allowing the direction of data transfer to change. The master device will read data from a slave device in the middle of the time-slots and at the edges of the time-slots for obtaining delay information (i.e. ½ clock cycle early).

Looking at the figure, the last time-slot (15) is used to pre-define the bus to a low level as start of a synchronization pulse. The next time-slot (number 0) is used to set the bus high and the border between the low-to-high transition is used for the slave device's clock recovery circuit to obtain correct synchronization between the master device and the slave devices. Time-slot 1 is used to set the bus idle and allowing the bus direction to change from the master device to the slave device writing to the bus. Based on internal delays in the slave device and external delays unknown to the slave device, it may change the output level somewhere inside time-slot 1. The master device can read back the bus level at the transition between time-slot 1 and time-slot 2. This reading will be used for the delay correction. Finally, the value of the bus located in the middle of time-slot 2 will be used as the returned value from the slave device for actual transfer of data, because here the bus has had time to settle and this scheme allows for maximum tolerance of jitter and noise (i.e. the sampling point is in the middle of the "data eye"). The time-slots 3-14 are shown idle in the figure but could involve the transferring actual data between devices as long as the data would not interfere with the delay measurement.

Figure 5:
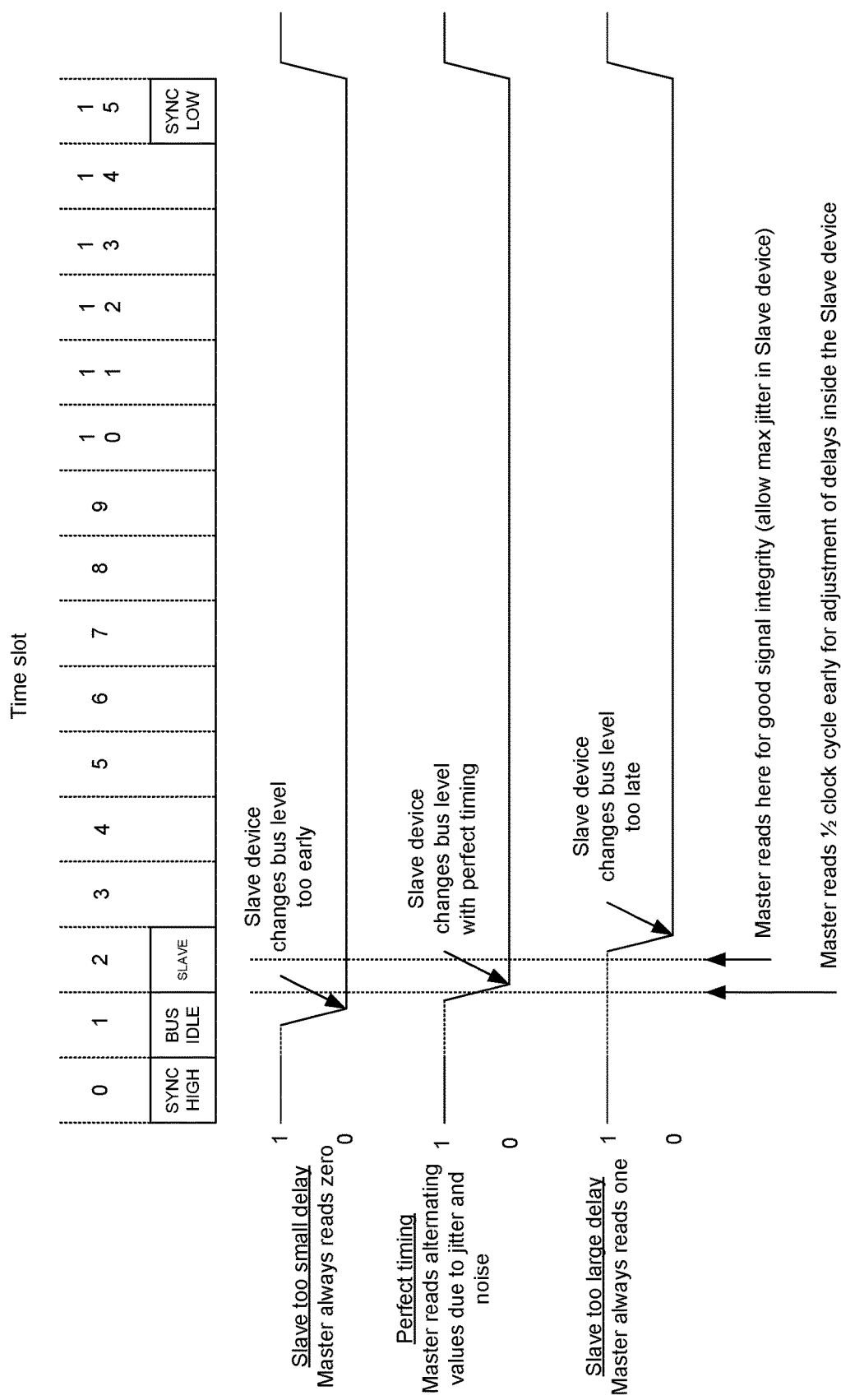
FIG. 5 illustrates a slave device writing to a master device with various delays (too small, calibrated, and too large), in accordance with one or more embodiments of the present disclosure.

FIG. 5 shows the details of the delay measurement in more detail. The first timing diagram at the top shows a slave device, where the delay correction has been set too low, with the result that the master device will always read back a change of the bus level, even at the test sampling point between time-slot 1 and time-slot 2. In the second timing diagram, the master device will read alternating values of zero and one (i.e. sometimes it will see a change of the bus level and sometimes it will not). Due to jitter and noise, the value that is being read back will alternate randomly. Finally, the last timing diagram at the bottom of the figure shows a slave device where the delay correction has been set too long, so that it responds too late to the required change. The master device will never see a change in bus level when it measures the bus level at the transition between time-slot 1 and time-slot 2. Finally, the actual value that will be used for communication between the slave device and the master device will be the value that is sampled ½ time-slot after the tested value, i.e. in the middle of time-slot 2.

Figure 6:
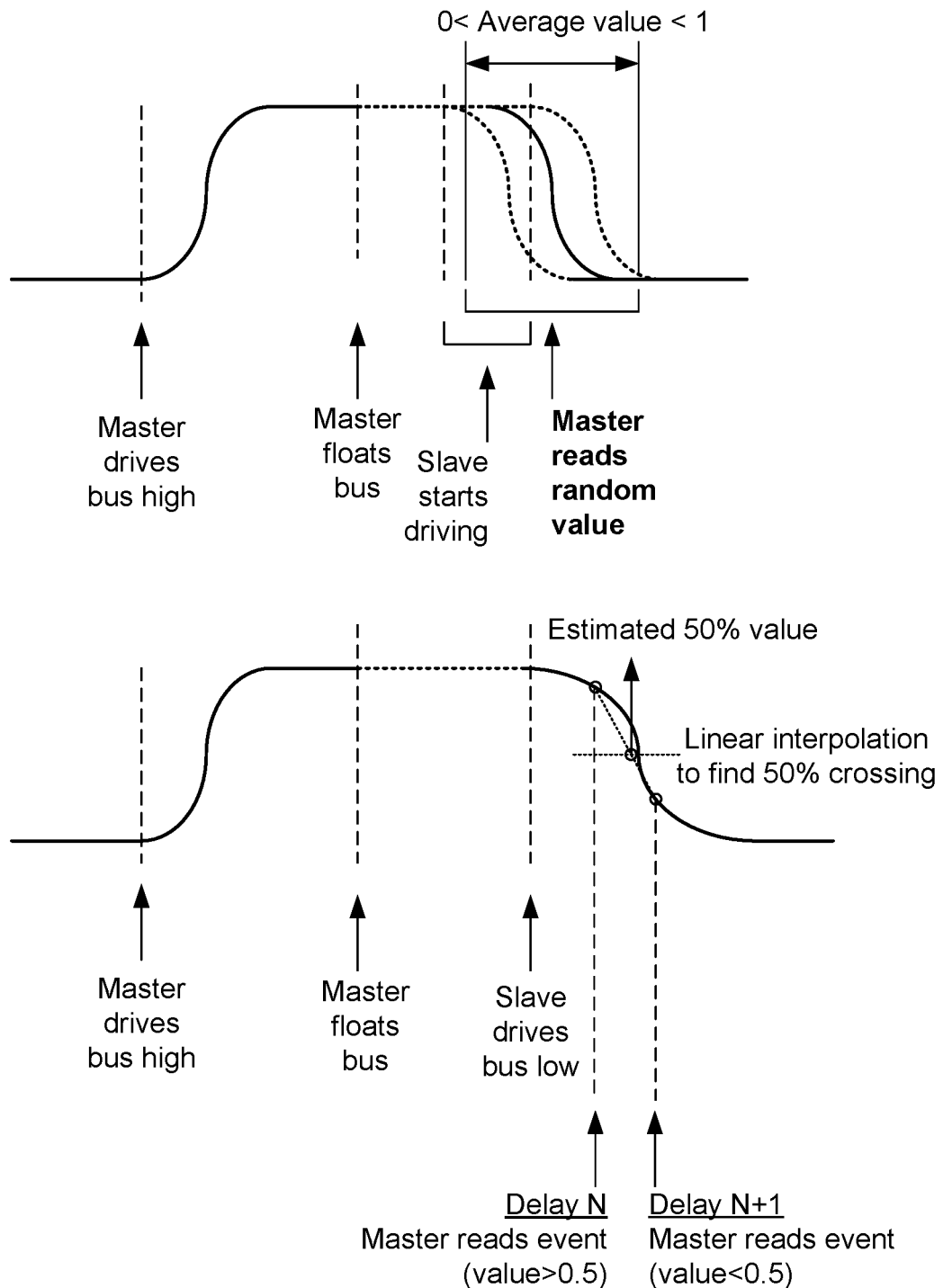
FIG. 6 is a timing comparison diagram showing variability of individual samples obtained from a slave device due to jitter and noise on the bus, in accordance with one or more embodiments of the present disclosure.

FIG. 6 shows that the measurement by the master device of the value written by the slave device will be modulated by noise and timing jitter. However, this variability may be used to obtain more than two levels when multiple samples are combined for a more precise adjustment. Due to the requirement of a very low power consumption in the slave device, the timing jitter will be considerable. However, in this application this will be used to our advantage, since it allows us to form an average of multiple measured values and they will together bring us information about the transition zone, where we will be able to determine not just if the value is before or after the transition, but accurately use the averaged values to adjust the delay setting to an optimal value, resulting in an average returned value of around 50% of either read value (50% low and 50% high) in many embodiments. If less than 50% of the returned bus values show no change it means the delay should be smaller for better signal integrity and if more than 50% show a change it means the delay should be set to a smaller value to optimize the bus bandwidth. The master device may either adjust the timing inside the slave devices itself or may simply write back the read values and let the slave devices adjust themselves. If the master device will adjust its own receiver timing, the slave devices will not require any adjustments, but while this scheme is simpler, it will result in a less than optimal use of bandwidth, since slave devices may interfere between each other unless extra bandwidth is allocated for variations. Therefore, it is recommended to adjust transmitter timing, not receiver timing.

Figure 7:
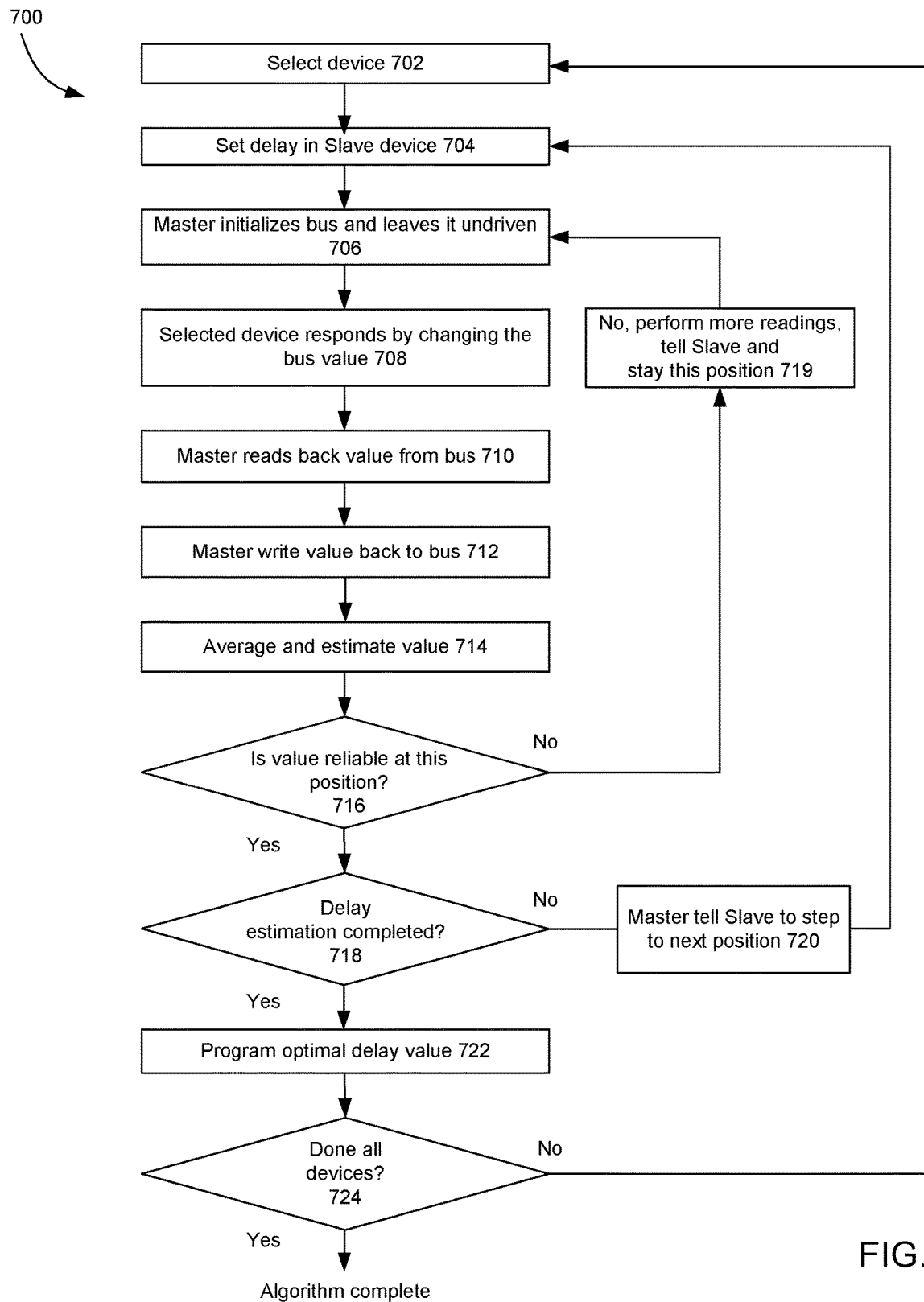
FIG. 7 is a flowchart illustrating an example programming of a slave device delay using one or more commands issued to the bus by a master device, in accordance with one or more embodiments of the present disclosure.

In FIG. 7 is shown an example of one or more commands issued by a master device to a bus system to perform a reading of slave device delays and optimal correction, in accordance with one or more embodiments. The issue of a command to the bus proceeds in the following fashion. First, the master device will issue synchronization information for a sufficiently long time that all devices attached to the bus will have obtained synchronization by their clock receiver circuits. Now they can read commands and data from the master device, but their own transmitter circuits will not be properly calibrated for internal and external delays just yet.

The command and procedure as shown in algorithm 700 will show an example of the overall steps involved. First the master device will issue a command to select what device to time correct, in step 702. The master device will set an initial delay in this slave device, in step 704 (this step may be skipped in some embodiments). Then the master device will initialize the bus to a known value and leave it undriven, in step 706. Notice, this event may be combined with the naturally occurring synchronization pulse that is being sent in every row. (time-slot 15 and 0 in FIGS. 4 and 5). In step 708 the selected device will respond by changing the current bus value, based on the slave device's internal timing. In step 710, the master device will then read back the current value from the bus, based on the master device's own timing. In step 712, the master device may optionally write back the value it has read from the bus, if the purpose is to let the slave device adjust the internal timing itself. Notice, the slave device can reliably read data from the master device since the synchronization pulse and commands from the master device are delayed equally. In optional step 714, the data are averaged before any time correction is being made. In step 716, it is considered if the value is reliable at this delay position, otherwise go back to step 706. In step 718, it is considered, if the delay estimation is complete, if so then change the delay setting and continue with a new delay value 720 otherwise tell the slave device that more readings are needed, in step 719. If the delay value is the optimal one, this should be used for the slave device 722 and when all devices attached to the bus have been calibrated in step 724, then algorithm is complete.

Figure 8:
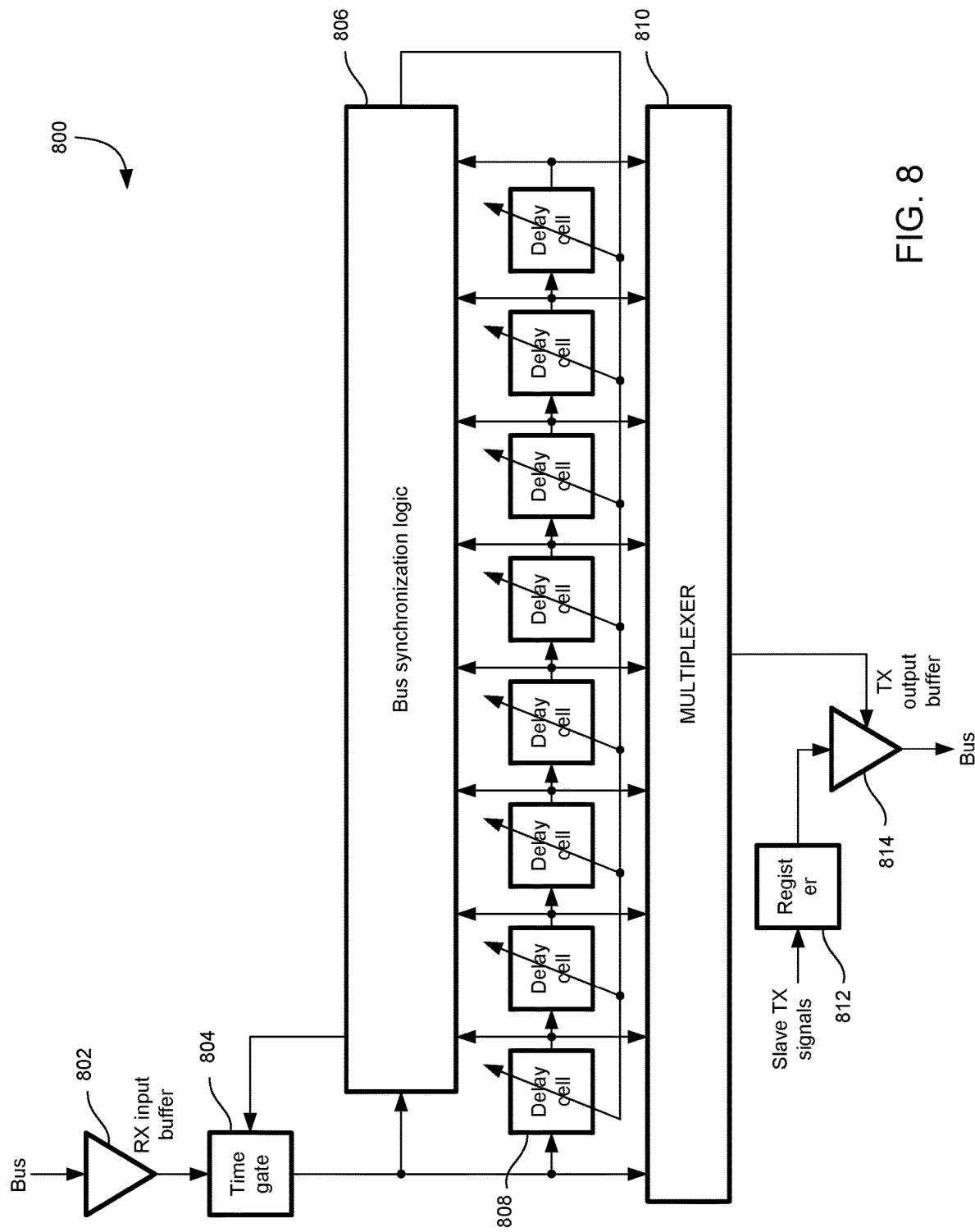
FIG. 8 is a block diagram illustrating internal logic from a slave device attached to a time-multiplexed bus with embedded clock information, in accordance with one or more embodiments of the present disclosure.

FIG. 8 illustrates an example embodiment of a circuit 800 for performing the internal delay correction inside a slave device based on a DLL topology. In this example, delay cells are used to obtain locking with the master device and controlling the emission of data from the slave device. If the clock recovery circuit is based on a DLL topology, it may be an advantage to use this circuit for the delay correction, since then the two circuits (clock-recovery and delay correction) may be combined into a single circuit. As illustrated, the circuit 800 includes an input receive buffer 802 to receive bus data, a time-gate 804 which is used to filter away bus traffic from synchronization pulses once a slave device has been locked to a master device, bus synchronization circuit 806 that ensures safe synchronization to the master device and controls the time-gate, delay cells 808 (eight shown, the number could vary with application) that are controlled by the bus synchronization circuit and used to divide a single row of data into individual time-slots, multiplexer 810 to select, delay and control the output timing, a transmit register 812 to contain the next data to be transmitted by the slave device and an transmit output buffer 814 to be connected to the bus. Based on the measured delay value, either the master device or the slave device will control the setting of the multiplexer and thereby adjust timing to the optimal value. This control may be performed once the system starts up or on a continuous basis to correct for environmental changes (e.g., changes in temperature that might affect internal and external delays in the bus system). Thus, by continuously monitoring and correcting for these delays, these device variations can be corrected, and the system can work continuously in an optimal manner. In cases where the required time adjustment exceeds that supported by a single time-slot, the slave device may be configured to transmit the pulses in a different time-slot to accommodate these larger delay adjustments (the delay adjustments as shown support delay adjustments within a single time-slot).

Figure 9:
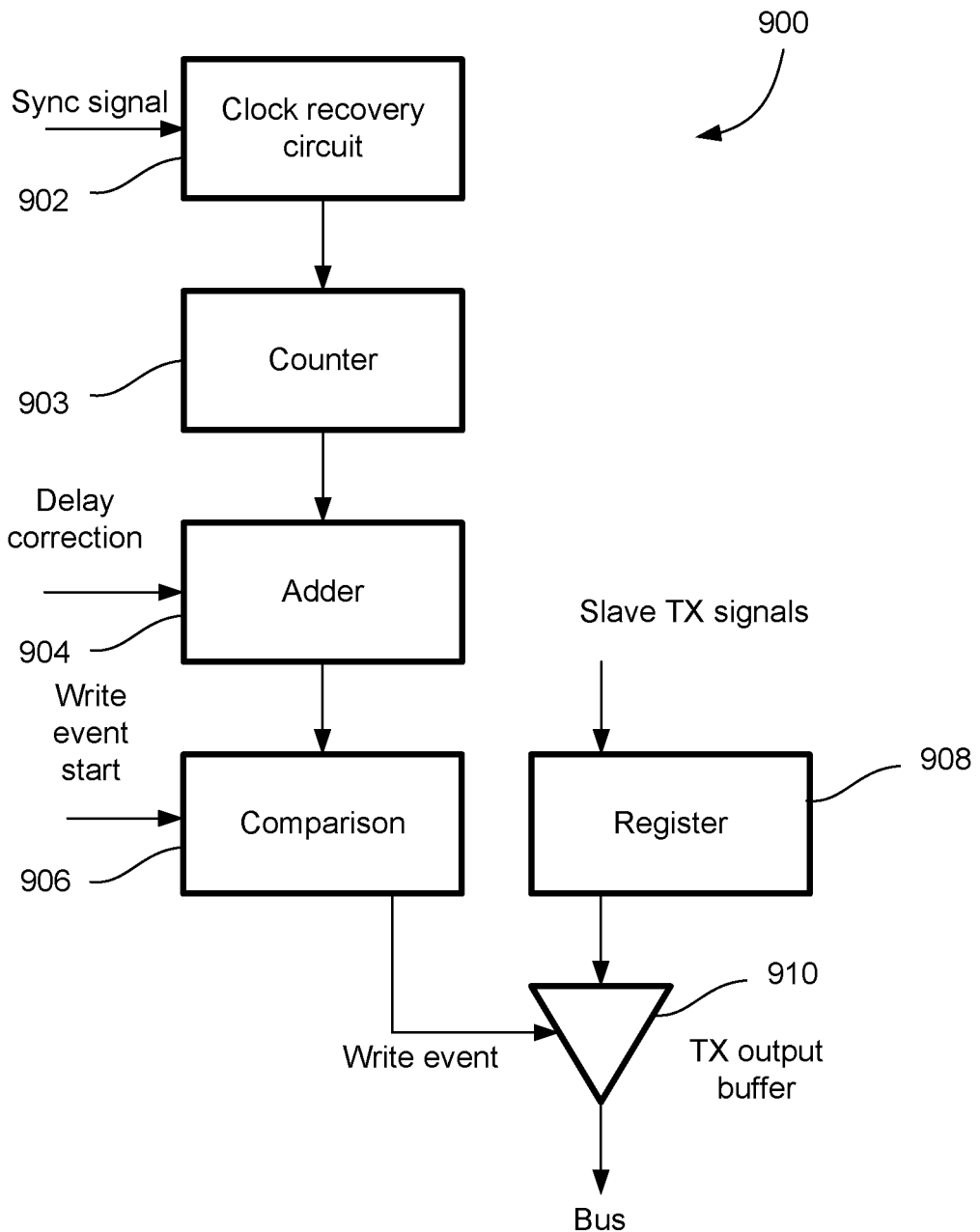
FIG. 9 is a block diagram illustrating a clock recovery circuit used to adjust the delays of one or more slave devices by correcting the timing events within a row or a frame, in accordance with one or more embodiments of the present disclosure.

FIG. 9 shows an example system 900 for performing the internal delay correction inside a slave device based on a digital correction unit, in accordance with one or more embodiments. The system 900 includes a clock recovery circuit 902, which may include a PLL that has been locked to the synchronization pattern provided by the master device, a synchronization circuit and time-gate (not shown), which is provided to eliminate data from influencing the clock recovery. This time-gate may first be activated after the device has obtained lock to the original synchronization pattern to guarantee lock. The will include a timing counter 903 and an adder (time correcting unit) 904 that changes the time of transmission event, and a comparator 906 to detect the start of transmission of data, a register for slave device output data 908 and the actual transmit output buffer 910. In some cases, the actual timing event may be programmed instead of adding a delay to the start of data. That way, there will be no need for the adder 904 and instead the correct start of data will be provided to the comparator 906.

The timing precision may be improved by almost a factor of two by utilizing both edges of a clock for timing adjustment. As an example, by having an internal high-speed clock of 250 MHz, a timing correction of 2 ns is possible by utilizing both edges. Thus, for the optimal delay setting, the error is at most 1 ns (i.e. +/−1.0 ns). The reason the timing is limited to less than a factor of two in this case is due to a less than perfect 50% clock duty cycle in real systems.

Figure 10:
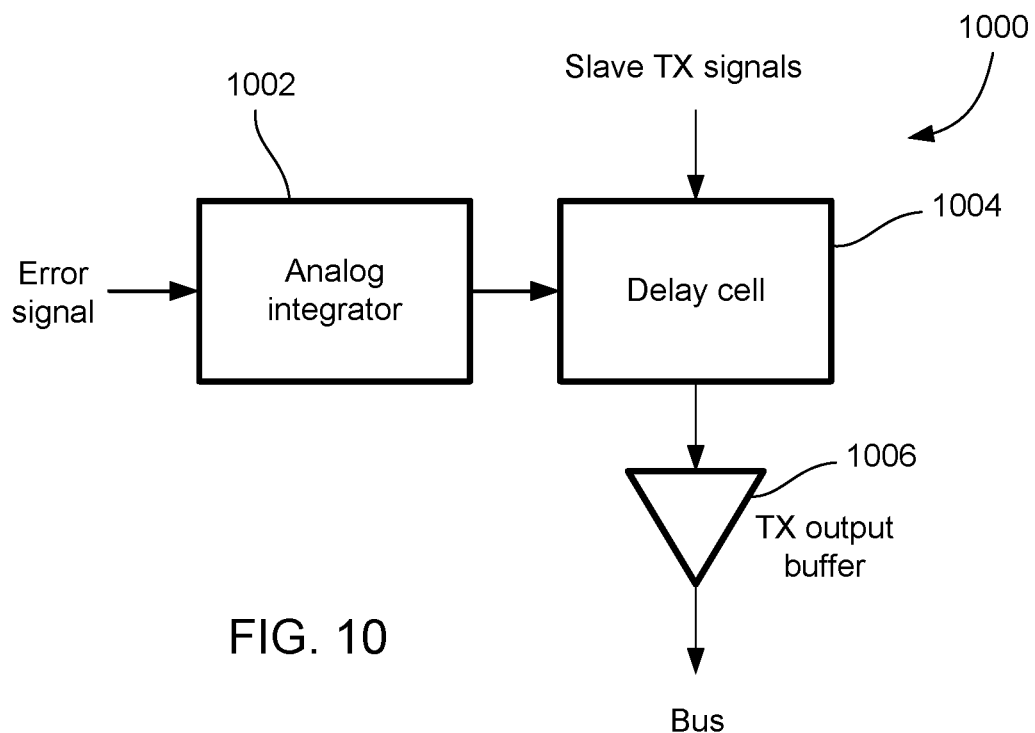
FIG. 10 is a block diagram illustrating a circuit using analog integration of returned delay information from the master device to adjust the internal delays of a slave device, in accordance with one or more embodiments of the present disclosure.

FIG. 10 shows an example system 1000 for performing the internal delay correction inside a slave device based on an integrator 1002, a delay cell 1004 controlled by the output from the integrator and transmitter output buffer 1006. Here the delay correction is performed on a continuous basis by summing up the returned values and use the integrated version of these to control the delay cell. Notice, due to internal leakage and other factors this circuit may require the delay measurement to be made on a regular basis or otherwise it might drift out of the optimal position.

Figure 11:
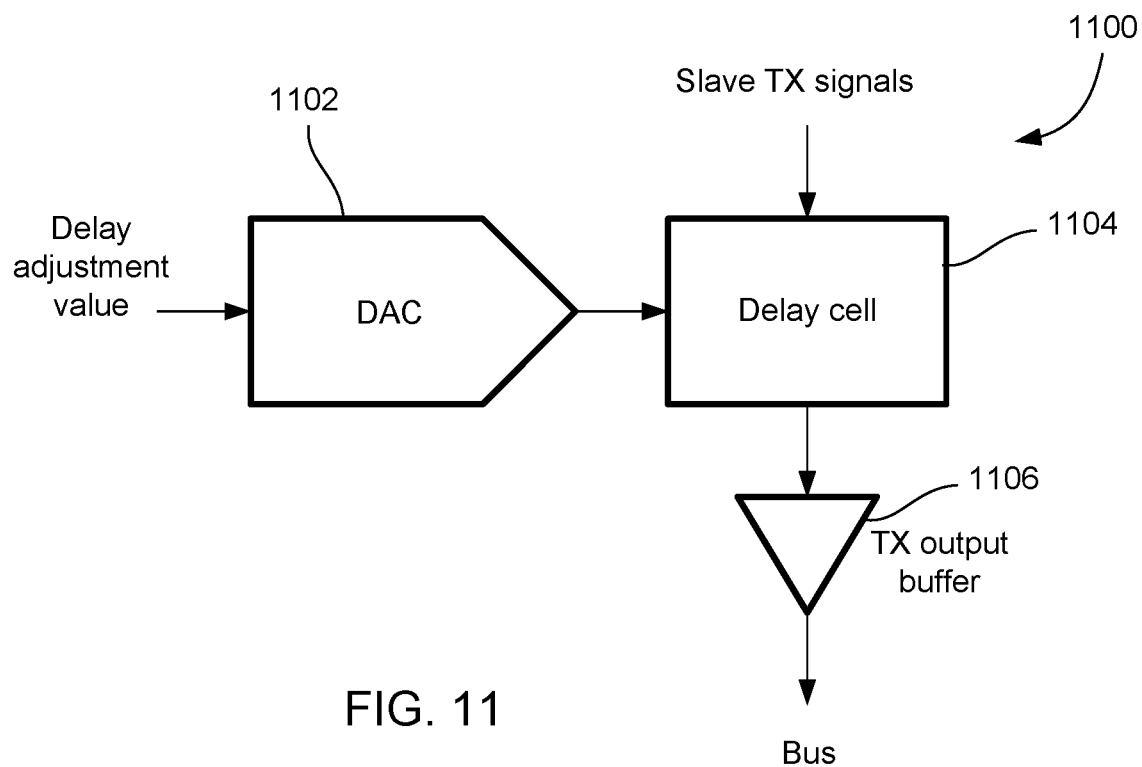
FIG. 11 is a block diagram illustrating a delay circuit configured to adjust the internal delays of a slave device circuit using a digital control algorithm and a digital-to-analog converter controlling the delay element, in accordance with one or more embodiments of the present disclosure.

FIG. 11 shows an example circuit 1100 for performing the internal delay correction inside a slave device based on a DAC (digital-to-analog converter) 1102, delay cell 1104 and an output transmit buffer 1106. This circuit will use a digital computed optimal delay value to control a DAC and the analog output from the DAC will control the delay of the delay cell. This in turn controls the output transmit buffer. The advantage of this circuit over system 1000 is that there is relatively little drift and internal leakage current will not cause it to move significantly away from the optimal delay position. The disadvantage is the need for a DAC, though it does not need to be of high precision as long as it is monotonic and has sufficient number of steps to control the delay cell. Thus, in some applications as little as 6-bit resolution may be enough to control the delay. For systems that encounter significant drift with temperature, it may be necessary to continuously run the calibration algorithm.

Four methods for obtaining a controlled delay between a master device and a slave device are shown in FIGS. 12-15, respectively. There are other methods that could be used for controlling these devices, e.g., bi-section search or binary search. However, the methods described here have the advantage, that we can ensure in a simple manner, that the steps taken are sufficiently small, so that we do not risk that the slave device will begin to overwrite any information provided by the master device or other devices attached to the bus. Furthermore, the algorithms described here are quite noise robust towards noise affecting the delays with selection of proper parameters.

Figure 12:
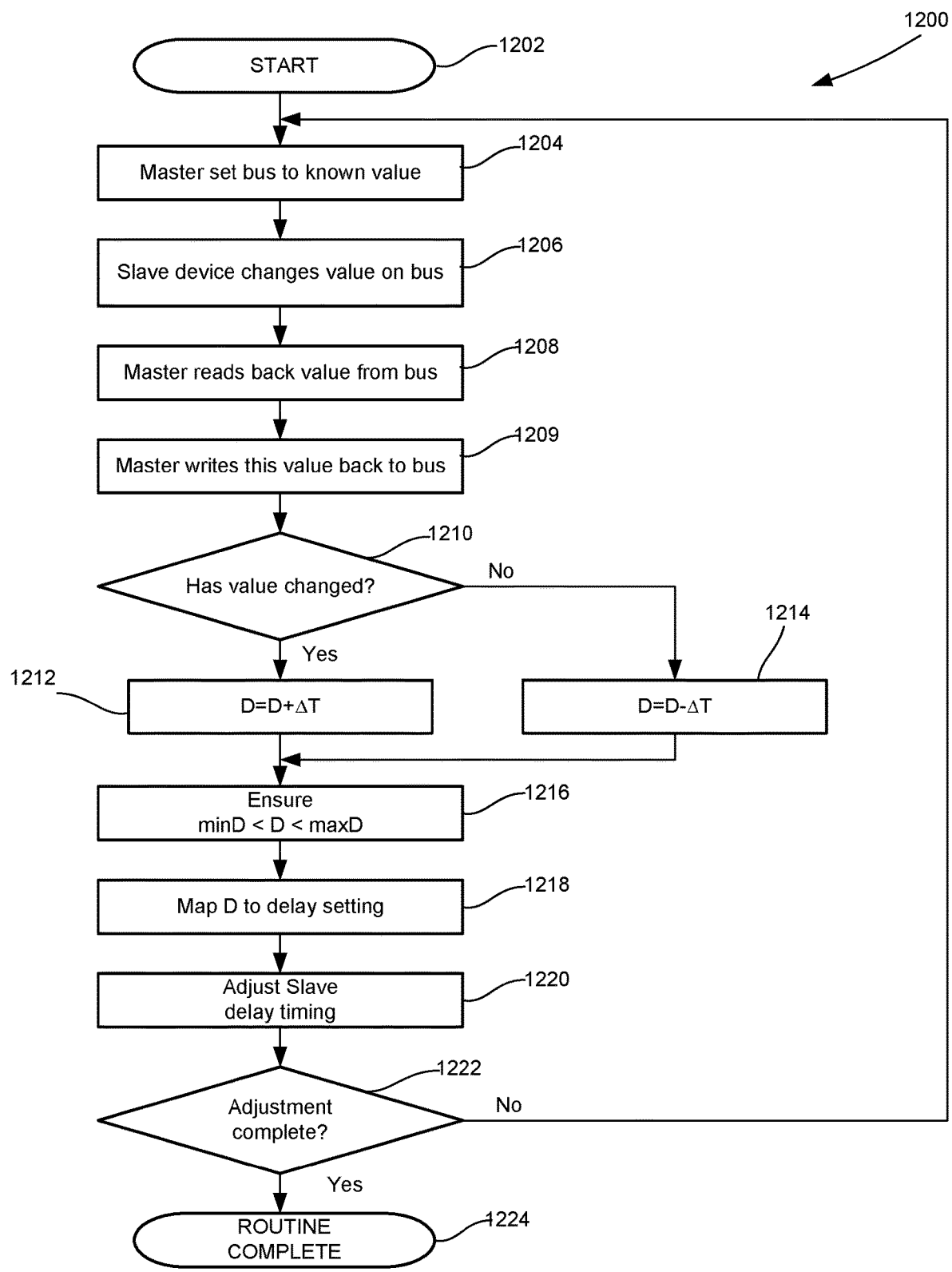
FIG. 12 is a flowchart illustrating a program, process, and/or algorithm configured to control internal master or slave device delays using a linear search, in accordance with one or more embodiments of the present disclosure.

FIG. 12 shows an example embodiment of a flowchart of a first algorithm. This method 1200 includes a linear search algorithm. For each cycle, the master device will set the bus, and the slave device will respond by changing the bus value. Based on the value read by the master device, the delay inside the slave device will be either increased or decreased by a small amount of time. In other words, if the slave device writes too late to the bus, the delay inside the slave device will be decreased by a small amount after performing a write to the master device and similarly, if the slave device writes too early (e.g., when more than half of all reads values by the master device are seen changed), the delay value will be increased. This method will ensure the jitter of the delay is well controlled by changing the delay in small step (e.g. 0.05 ns), but this also means, that for large delay changes (e.g. 20 ns), the algorithm may go through several hundred steps (iterations) before reaching the ideal delay. Thus, this method is a compromise between fast settling time and good convergence and for a given low jitter requirement, this will result long settling times. The method works in detail as described below.

The algorithm starts at step 1202, the entry point to the adjustment procedure. The master device will then set the bus to a known value at step 1204, and in step 1206 a slave device will change the value on the bus. After the master device has read the current value from the bus, it may optionally write back the value it read from the bus in step 1209 and the slave device may use this value for self-adjustment. If the master device is controlling the slave device delay, this step may not be needed. Notice, the master device is operating in step 1204 and step 1208 based on its own timing and similarly, the slave device will perform step 1206 based on the slave device internal timing. In general, these timing references will be different and therefore a correction in timing may be needed. A decision is made in step 1210 based on the returned value from the bus (read in step 1208). If the value has changed, we know that—statistically speaking because the returned values are influenced heavily by jitter and noise—that the delay is too large. Thus, if this is the case, the current delay will be adjusted slightly upwards, e.g. by +0.05 ns. Otherwise, i.e. no change in the bus value was detected, the delay is too large (in the statistical sense again) and we will make a small correction in the opposite direction, e.g. −0.05 ns. These values are just examples and many other values could be used. If we choose a larger value, the search time to find the optimal delay will be faster, but the final output jitter due to random variations, will be larger, so this is a compromise. In step 1216 we will ensure the output delay is within system limits, i.e. we will not increase the value beyond what is known as the maximum value we can correct for neither decrease beyond the lowest value the circuit can handle. Then in step 1218 the integrated delay value is mapped from an internal register to the actual delay setting (e.g., the number of practical delay settings may be less than the precision used to calculate the value) and in step 1220 the actual slave device timing is corrected. Finally, in step 1220 it is determined if the algorithm is complete or not. If the algorithm is not complete, it will continue from step 1204. A determination of the algorithm is complete or not can be done either using a known maximum number of iterations the algorithm can take or by using an averaged value of the number of returned zeros and one. Once this average over many iterations (e.g. 100) reach 0.50, we have reached the optimal delay timing correction. To allow some tolerance, the algorithm may exit once the average has reach a value in a range of, say 0.47-0.53. In another embodiment, the master device may adjustment the slave device delay in step 1209 (e.g., no delay change, increase delay or decrease delay).

Figure 13:
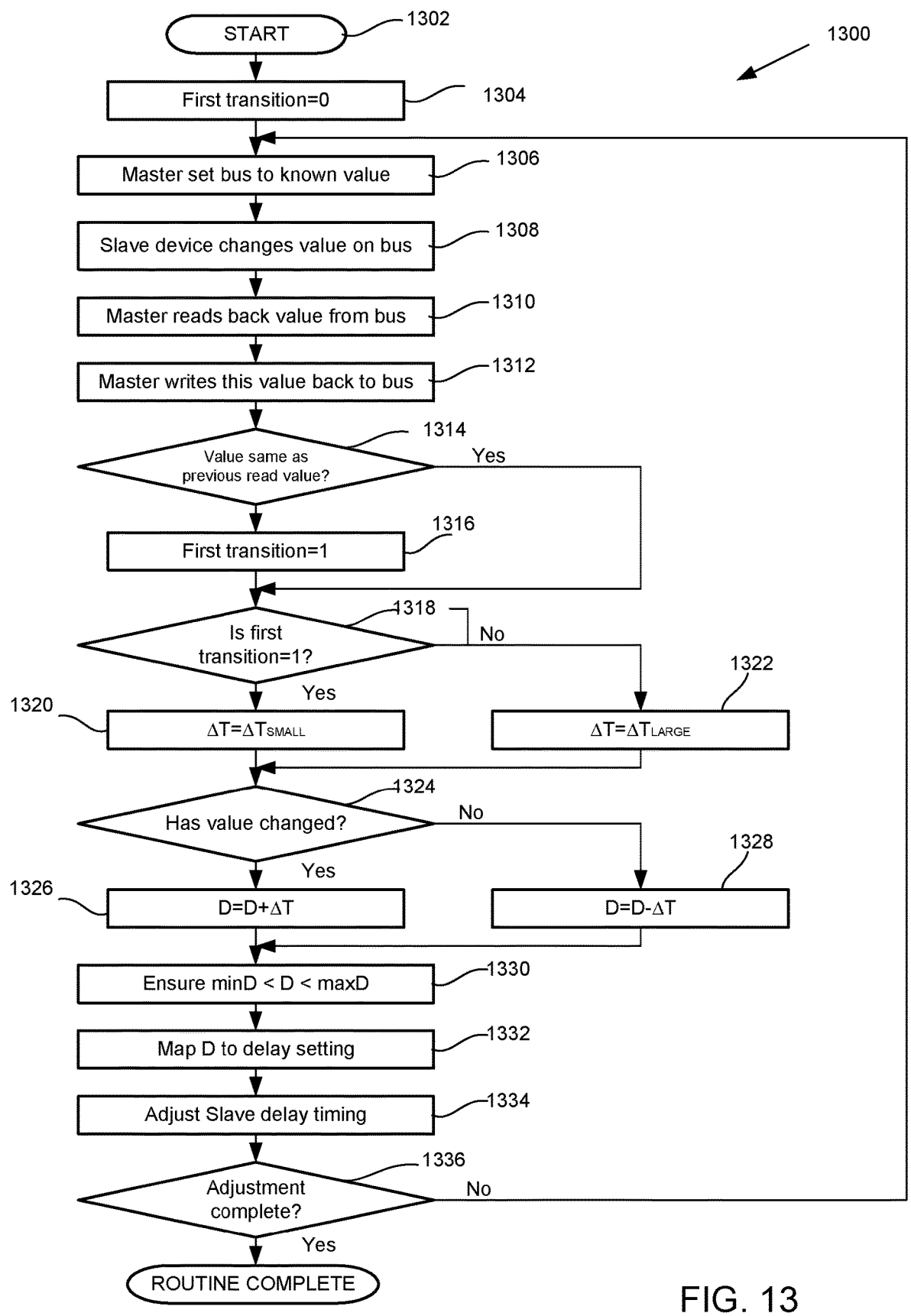
FIG. 13 is a flowchart illustrating a program, process, and/or algorithm configured to control internal master or slave device delays using a linear search method with two step sizes, in accordance with one or more embodiments of the present disclosure.

FIG. 13 shows a flowchart 1300 of a second algorithm. This method is a linear search algorithm that have been improved by including two adaption speeds. Initially, the method will make larger delay adjustments (e.g. 1-2 ns) and after the first transition has been found (by measuring a different value by the master device from the slave device than the previous value the master device sampled from the slave device), it will change to a slower tracking mode with time steps around 0.05 ns to ensure the jitter is controlled. This will improve the settling time of the simple method one considerably, but just a single noisy measurement will make the method change to slow mode and then the adaptation will be slower. The jitter is slightly higher for this method as compared to method one. The method works in detail as described below.

The algorithm starts at step 1302 and sets a flag (first transition) equal to zero in step 1304. This flag is used to find the point, at which the returned read value is different from the previous read bus value after a slave device response. In step 1306 the master device will set the bus to a known value and then release the bus while the value may be maintained by a bus holder. In step 1308 the slave device will change the bus based on its internal timing and in step 1310 the master device will read the bus based on the master device internal timing. In step 1312 the master device may optionally write back the value it has read from the bus so that the slave device can self-calibrate its own timing. This optional step is not needed if the master device is directly setting the slave device's timing value and may be included if the slave device will control the timing itself. In another embodiment, the master device may also control the slave device timing in step 1312 by issuing a change to the current delay value (e.g., no change, increase delay, decrease delay).

In step 1314 it is determined, if the bus value read back by the master device is the same as the previous value read back by the master device (notice, in the first sequence of running this algorithm, the two values shall be assumed the same, because no information is available and the flag "first transition" will stay zero). If the two values are the same, the flag "first transition" will remain zero, but if the two values are different, it will now be set to one or true in step 1316. This flag is used to perform a quick search initially and a slower and more accurate search once a transition has been found. In step 1318, a decision is made based on the value of the "first transition" flag. If there has been no change in value, we will continue with a fast search 1322, but once a single transition has been found, we will continue with the slower and more accurate delay correction as defined in step 1320. A value for the delay value in the fast-forward mode may be, for example, 0.75 ns, but will depend on the application, and a value for the slow and more precise stepping may be, for example, 0.125 ns, depending on the application. These values can easily be represented using binary arithmetic. The process performed in steps 1324 to 1336 may be identical to the steps 1210 to 1222 described in method one and will not be repeated. This algorithm has the advantage of a faster search time while maintaining the same jitter performance as algorithm one.

Figure 14:
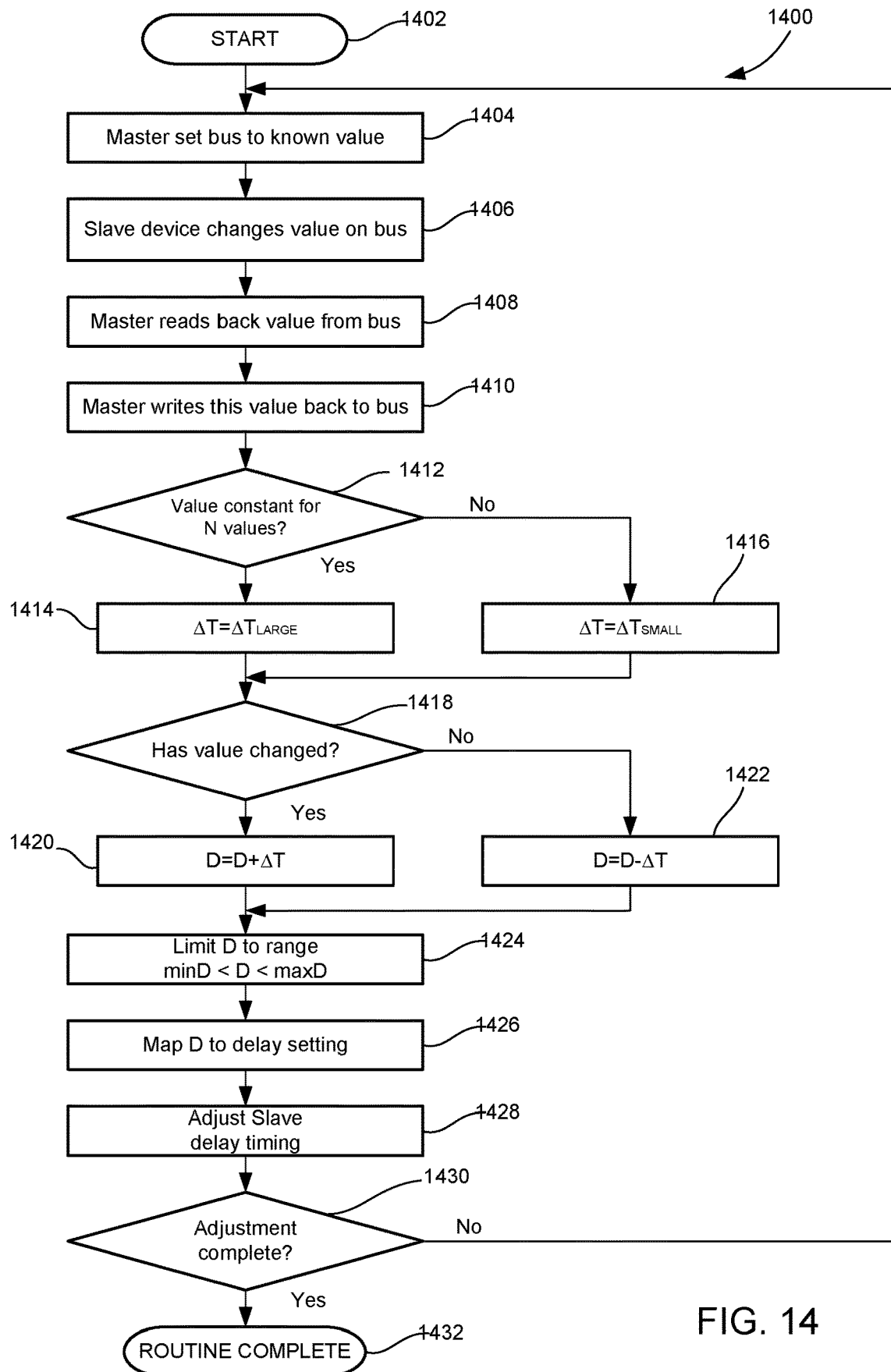
FIG. 14 is a flowchart illustrating a program, process, and/or algorithm configured to control internal master or slave device delays using an adaptive two-step linear search method, in accordance with one or more embodiments of the present disclosure.

A third algorithm is shown in FIG. 14 and is an evolution of the second algorithm, where the algorithm can change between slow and fast mode all the time, based on the previous N values. If all N previous read values are the same (i.e. we are adapting in the same direction), then the larger of two-time steps will be taken ($\Delta T_{LARGE}$). If there are any differences between the N last values read, the smaller time step will be taken ($\Delta T_{SMALL}$). This method is much less sensitive to noise and jitter as compared to method two and achieves faster settling time with slightly larger jitter than method two. The method works in detail as described below.

The algorithm 1400 starts in step 1402 and then the master device sets the bus to a known value in step 1404 and releases the bus. A bus holder may be present and keep the bus state when no devices are driving the bus using a medium output impedance (e.g. in the range of 1-2 kΩ). slave device changes the bus values in step 1406 and the master device will read back the bus value in based on its own timing in step 1408. The master device may optionally write back the read value to the bus in step 1410 for the slave device to use for self-adjustment. If the master device is controlling the delay of the slave device, this step is not needed, and the master device may control the delay of the slave device either by issuing an exact delay value or by controlling the current value (e.g., no change, increase delay, decrease delay). In step 1412, a decision is made based on the past N samples read by the master device. If there has been no change in the last N samples we will take process 1414, where a large adaption value is used. A value of the fast adaption value (process 1414) may be 0.75 ns while a value of the slow adaption value (process 1416) may be 0.125 ns. A value of N may be 8 in various embodiments to ensure that there is no oscillation between the high and the low adaption value even with significant noise. Steps 1418-1432 are identical to steps 1210-1224 and therefore the description will not be repeated. This algorithm works well even in presence of significant noise and while there may be a few steps that are taken too slow, in general it will adapt as fast as possible using two step values only.

Figure 15:
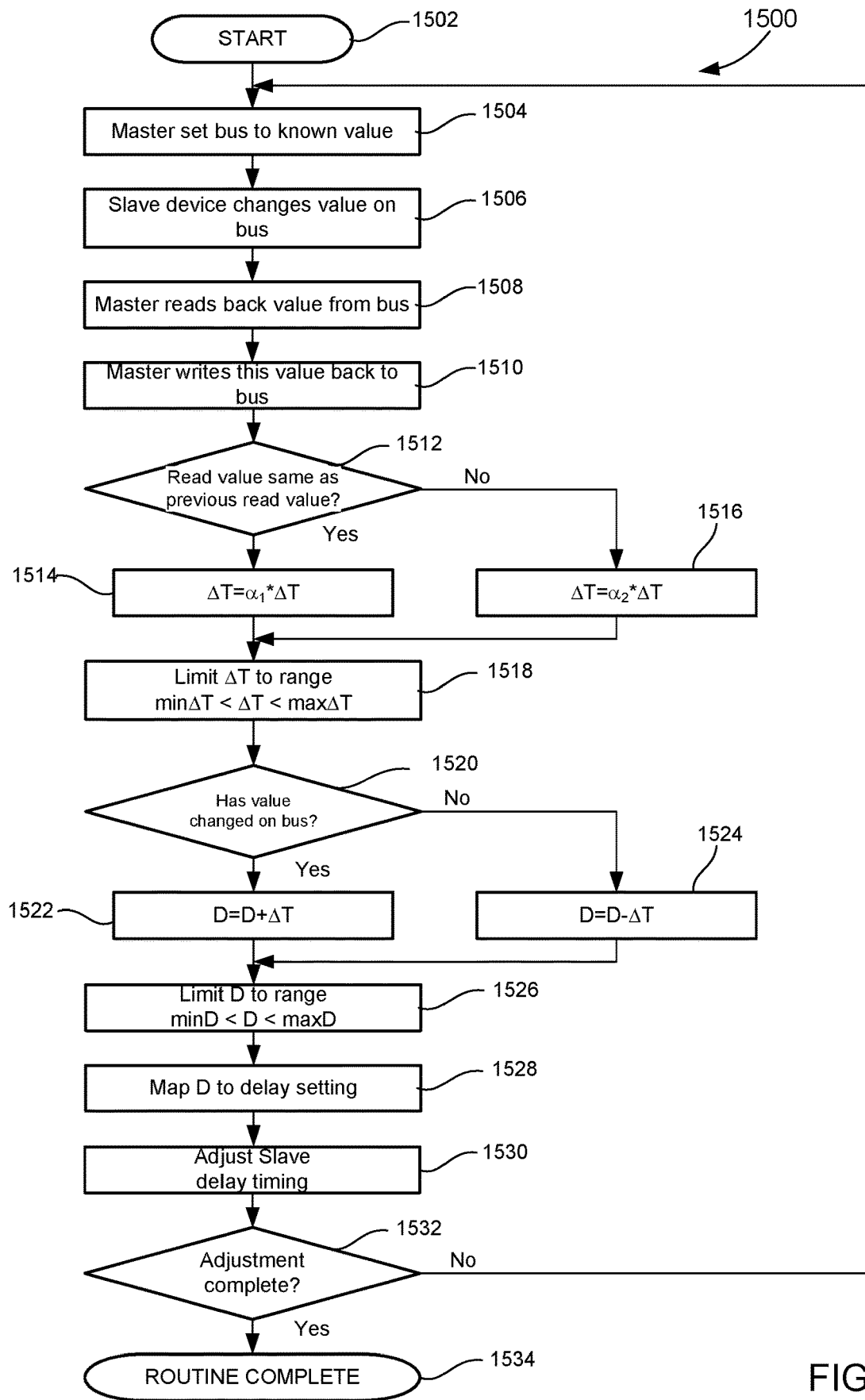
FIG. 15 is a flowchart illustrating a program, process, and/or algorithm configured to control internal master or slave device delays using an adaptive multi-step linear search method, in accordance with one or more embodiments of the present disclosure.

The fourth algorithm is shown in FIG. 15 and is a further evolution as compared to the third algorithm illustrated in FIG. 14. Here we will increase the time delay changes whenever the master device samples the same value twice on the bus and otherwise the delay will be decreased. At a certain point an equilibrium will be reached, giving close to 50% average read value of the two possible returned values (low or high, zero and one) depending on the update coefficients. In other words, the length of the next delay adjustment will be as follows for a change in value: $\Delta T = \alpha_1 \times \Delta T$, where $\alpha_1$ will typically be in the range of 1.05 to 1.2. It may be an advantage to choose a number that is easily represented without rounding error in binary arithmetic, e.g. $1+\frac{1}{8}=1.125$ that can be implemented as a coefficient using addition instead of multiplication.

If there is no change in value, the length of the next delay adjustment will be as follows: $\Delta T = \alpha_2 \times \Delta T$, where $\alpha_2$ will typically be in the range of 0.8 to 0.95. It may be an advantage to choose a number that is easily represented without rounding error in binary arithmetic, e.g. $1-\frac{1}{8}=0.875$ that can be implemented as a coefficient using addition instead of multiplication. Due to the adaptive step size this method works the fastest and has almost the same jitter performance as method one (the jitter may be further lowered by a slight increase in settling time). To ensure stability of the algorithm, there will be bounds to the minimum and maximum value of the delay change, thus a minimum and maximum step size in the delay be implemented. The method works in detail as described below.

In step 1502 the algorithm 1500 starts. In step 1504 the master device sets the bus to a known value and in step 1506 the slave device changes the bus value based on its own timing. In step 1508 the master device read the value on the bus based on the master device's timing. In the optional step 1510, the master device writes back the value it has read. This step is only needed, if the slave device is going to self-adjust its internal timing. If the master device is controlling the delay of the slave device, this step is not needed. In this case, the master device will either control the timing of the slave device by writing an absolute delay value or by issuing a change to the current delay value (e.g., no change, increase delay, decrease delay). In step 1512, a decision is being made, if the previous two values read by the master device from the bus are the same. In the first iteration of this algorithm, a default initial delay value will be used in step 1514, e.g. 0.75 ns. If the two returned values are the same, this is an indication we are in a range of the delay adjustment, where there is little noise. This means we should try to move faster. This is being accomplished by multiplying the delay adjustment value by a factor larger than one, e.g. 1.125. However, if the two values are different, smaller steps are used (step 1516), since this is an indication that we are in the noisy area in the middle of the transition where we will often fluctuate between zero and one. A delay adjustment correction factor will now be less than one (e.g., 0.875). From this point we will now limit the time adjustment in step 1518 to be within a certain range e.g. $\frac{1}{128}$-1.0 ns due to the limited precision in the arithmetic and to avoid the overwriting data from other devices. Steps 1520-1534 may be identical to steps 1210-1224 and the description will therefore not be repeated.

Finally, an average of the returned values may be used as an indicator of when the algorithm has finished e.g. by forming a weighted average, e.g. average=0.99*average+ 0.01×(last read value). In some application a fixed and finite number of iterations may be used instead based on known information about the noise and jitter level and known settling characteristics, e.g. the algorithm may be considered complete after 40 iterations.

Each of these methods can be supplemented with the forming of an average of two or more values sampled on the bus, this may be particularly effective, if the master device is controlling the slave device, because in this case it may be beneficial to perform multiple read operations before each write operation because the write operations will take longer than the reading of a single bit.

An initial guess for the delay is used for a real implementation. Since there is a known range which the entire system will have to converge within, e.g. from −10 to +30 ns delay, it might be reasonable to choose an initial value equal to the midpoint of this range. However, to avoid problems with overwriting other devices output including overwriting of the master device output, it may be advantageous to increase the starting point slightly, e.g. in the example above to use an initial value of delay=15 ns. This may mean that it will take slightly longer to converge to the most negative as compared to the most positive delay setting (i.e. converging to −10 ns will take longer than +30 ns). In the most conservative design approach, the largest delay would be chosen as the initial value for maximum protection against overwriting early values from other devices.

Figure 16:
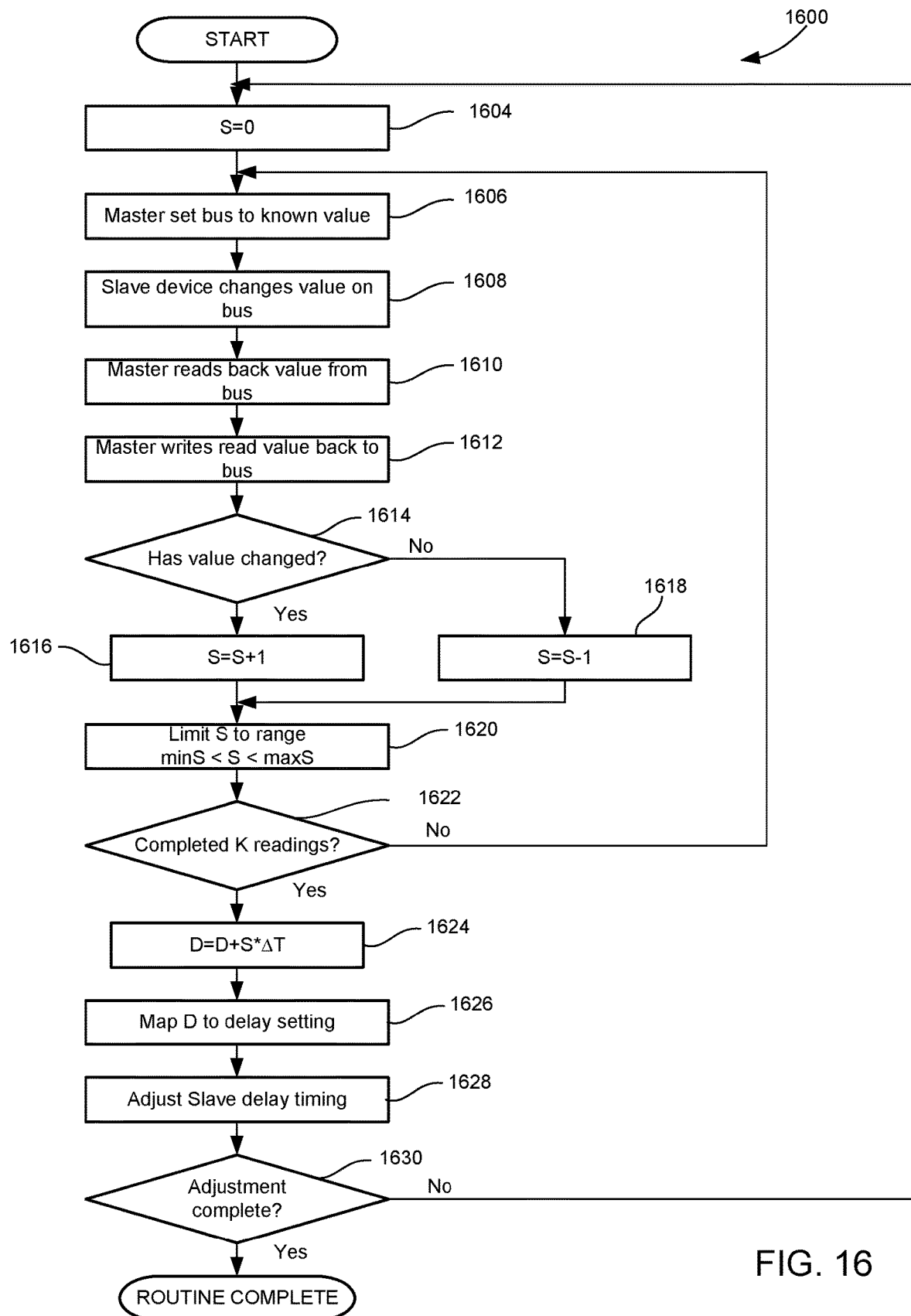
FIG. 16 is a modification to the algorithm of FIG. 12 that includes multiple read measurements before each delay adjustment, in accordance with one or more embodiments of the present disclosure.

In FIG. 16 is shown an example of extending algorithm one to use of multiple read samples before performing a delay adjustment. Apart from the averaging of multiple samples before performing an adjustment, algorithm 1600 may be similar to the first algorithm of FIG. 12. For example, steps 1606, 1608, 1610, 1612 and 1614 correspond to steps 1204, 1206, 1208, 1209 and 1210, respectively. Some changes include initializing a value to zero (step 1604) and forming a sum in steps 1616 and 1618 based on the past read value from the bus and repeating the reading from the bus K times based on a decision made in step 1622 and forming the final delay correction in step 1624. Steps 1620, 1626, 1628 and 1630 may correspond to steps of 1216, 1218, 1220 and 1222, respectively, of FIG. 12.

The second, third and fourth algorithms could similarly be extended to the use of multiple samples before performing a delay adjust. However, when the control algorithm is located inside the slave device, it may be better to dynamically change the delay values between each read and write operation, because the slave device can itself change multiple bits inside the device, based on the reading of a single bit from the bus. Thus, the update operation will require less bandwidth and is therefore potentially more efficient. In another embodiment, instead of updating the absolute delay value in the slave device, the master device will issue changes to the current value to decrease the bandwidth required for adjustments.

In addition to these methods, methods using bi-section search and binary search may be used, for example. However, due to the problems in adjusting the delay so negative that the slave device output data begin to collide with the master device value and associated unknown values, it is suggested, that is these methods are to be used with some limit on the maximum step size to be included to avoid this situation.

By use of computer simulations, we can compare the four algorithms more precisely. The simulations were based on the following specific settings for the algorithms: General jitter level was 1.2 ns (rms), gaussian noise. For practical circuits, this would normally be in the range 0.3-1.5 ns after reception and control inside the slave device.

First Algorithm (FIG. 12): The step size was set to 0.05 ns and the delay adjustment precision was set to 0.1 ns.

Second Algorithm (FIG. 13): The step sizes were set to 0.125 ns and 0.75 ns. The delay adjustment precision was set to 0.1 ns. The initial step value was the larger step size (0.75 ns).

Third Algorithm (FIG. 14): The step sizes were set to 0.125 ns and 0.75 ns. The delay adjustment precision was set to 0.1 ns. If the level read back from master device was unchanged in N=8 consecutive measurements, the step size was set to 0.75 ns. If there was any change before 8 same value measurements had been accomplished, the value was changed back to the lower one (0.05 ns). The initial step value was the larger step size.

Fourth Algorithm (FIG. 15): The delay size was set to be between ⅟₁₂₈ ns and 1 ns. The delay adjustment precision was set to 0.1 ns or 2.0 ns, see Table 1. The initial delay step was 0.75 ns. The delay step change was changed by a factor of 1.125 if the previous delay value was the same as the current read value by the master device. If there was a difference between the current and previous value read by the master device the delay step size was multiplied by 0.875. Notice, this multiplication of 1.125 and 0.875 can be implemented as a simple addition either (1+⅛) and (1−⅛) using binary arithmetic. The actual delay was the updated based on the current read value, if the value was low, the last delay value was incremented by the delay step value. If the present read value was high, the actual delay was decremented by the present delay step value.

TABLE 1

| Parameter | Unit | Linear search | Two-step, initial value | Two-step adaptive | Multi-step adaptive |
|---|---|---|---|---|---|
| Delay jitter* (ns)/0.1 dt | ns | 0.91 | 1.35 | 1.56 | 0.94 |
| Delay jitter* (ns)/2.0 dt | ns | 2.21 | 3.46 | 3.53 | 2.03 |
| In-lock (T = −10 ns) | Iterations | 490.3 | 37.6 | 38.9 | 25.7 |
| Std dev in-lock | Iterations | 3.5 | 6.2 | 3.2 | 1.0 |
| In-lock (T = 10 ns) | Iterations | 87.5 | 7.7 | 11.9 | 5.0 |
| Std dev in-lock | Iterations | 4.4 | 3.9 | 3.2 | 0.0 |
| In-lock (T = 30 ns) | Iterations | 291.7 | 115.9 | 27.3 | 17.3 |
| Std dev in-lock | Iterations | 3.9 | 1.9 | 3.2 | 0.8 |
| Average value | Number of ones | 0.48 | 0.48 | 0.49 | 0.45 |

In this embodiment, the error probability is 10-12 and the in-lock search time and variation of in-lock time based was based on 12 simulations. The delay jitter of 0.1 dt means an output resolution of 100 ps in delay adjustment, and 2.0 dt means an output resolution of 2.0 ns in the delay adjustment.

Figure 17:
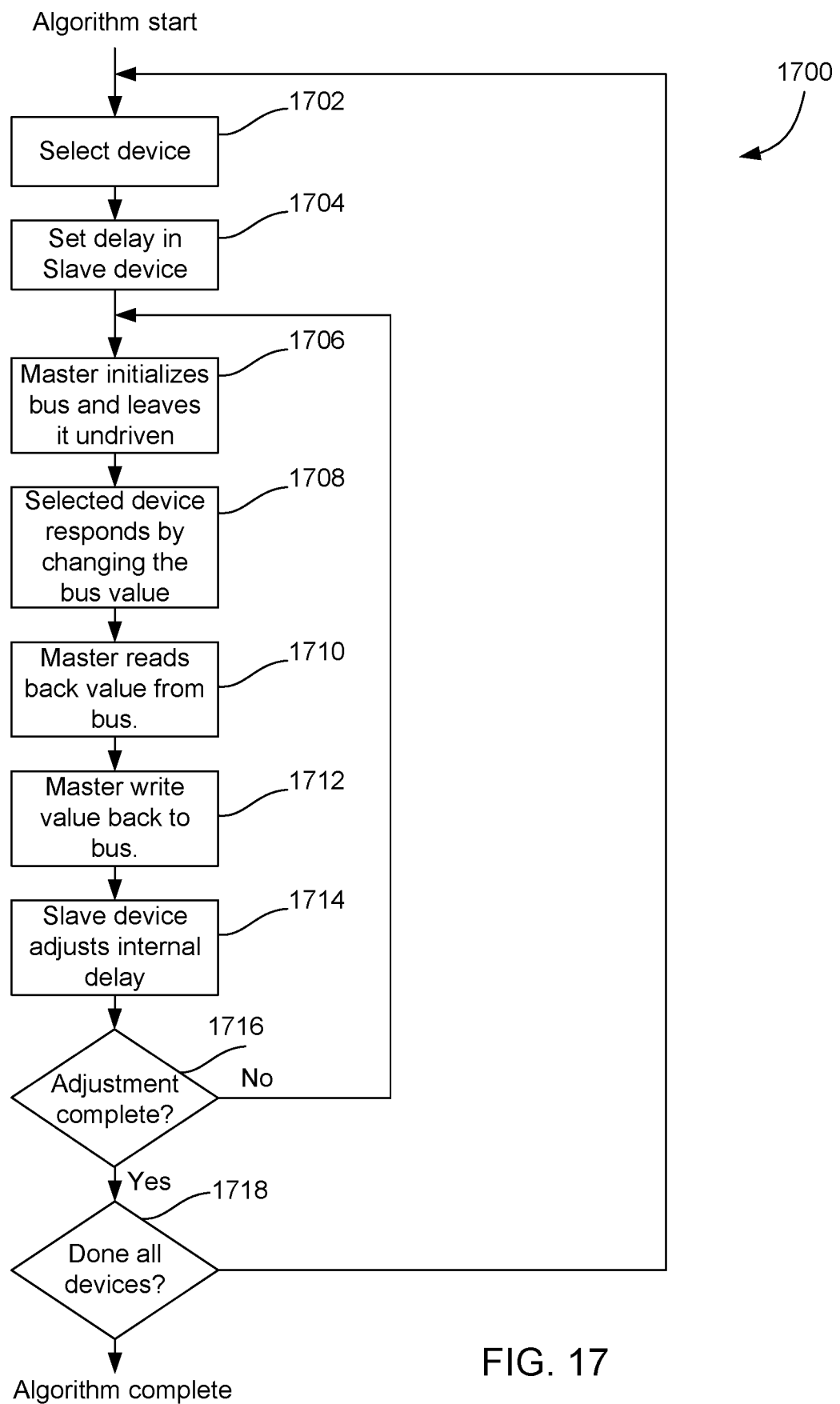
FIG. 17 is a flowchart illustrating a program, process, and/or algorithm implementing an adjustment procedure where a master or slave device self-adjusts its internal delays using multiple read-write sequences, in accordance with one or more embodiments of the present disclosure.

FIG. 17 shows an example algorithm or bus command to be used for adjusting the delays of slave devices, in accordance with one or more embodiments. The algorithm 1700 starts in step 1702 where the master device selects what device that should respond. In step 1704 the master device may set an initial delay value in the slave device. Notice, this step is optional. The slave device may already have adapted to a good delay value and the algorithm may run merely for a minor adjustment. Also, the slave device may have an initial internal value that would not require any adjustment. Again, in this case the master device will not need to set an initial value inside the slave device.

In step 1706 the master device will set the bus to a known value based on the master device's internal timing. By changing the known value (e.g. alternating between low or high) the master device sends out to the bus in step 1706 before the slave device changes the value on the bus, the adjusted delay may be based on both the falling and rising data edges from both the master device and slave device thereby forming a more accurate average.

In step 1708 the slave device will respond by writing back a different value to the bus, based on its own internal timing. In step 1710 the master device will read back the value on the bus based on its own timing. Typically, this read event would happen ½ timeslot before the data from the slave device is supposed to have settled fully. In step 1712 the master device will write back the read value to the bus. This could happen in the same row as the read event (e.g. in timeslots 3-14 with the timing shown on FIG. 4-5) or in a subsequent row. Alternatively, the master device would control the absolute delay or issue a change to the current delay in the slave device.

In step 1714 the slave device will adjust its own internal delay based on the value that was written back by the master device. The adaption and adjustment of the delays may be performed as shown in the four algorithms (as shown in FIGS. 12-15, respectively).

In step 1716 a determination of whether the adjustment procedure is complete is made. This could be based on a finite and known number of iterations (e.g. each delay adjustment command may use 32 delay adjustments) or based on the convergence of the delay (have the read back value reached an average of around 0.50, based on approximate equal number of received logical zeros and ones or have the position not changed for some time). If the number of steps is not finite, either the master device or the slave device will need to provide feedback as to tell when the algorithm is complete, otherwise continue the adjustment from step 1706. Finally, a determination is made, if all devices have been properly adjusted in step 1718. If this is not the case, we will continue with step 1702. The determination of when the algorithm is complete can be based on the current step size, the number of iterations used or when the average read value is within a given interval, e.g. 0.4-0.6 and a certain number of iterations has been reached or if the adjusted delay value has not changed for a given number of iterations.

In other embodiments, the master device will adjust the internal timing of the slave device in step 1712 by issuing a change to the current delay value (e.g., no change, increase or decrease).

In some embodiments, two slave devices may adjust the delays between these two devices in a similar manner as between a master device and a slave device. In this case it will be the receiving slave device that will read the change of the current bus value and adjust the timing of the transmitting slave device, either by reflecting the read value or by adjusting the actual delay in the other slave device.

In some embodiments, a slave device may adjust its own timing without any interaction from any other device, in this case, the timing may be closely aligned with the received synchronization pattern but will not include adjustments for bus diameter and other delays in the system.

Figure 18:
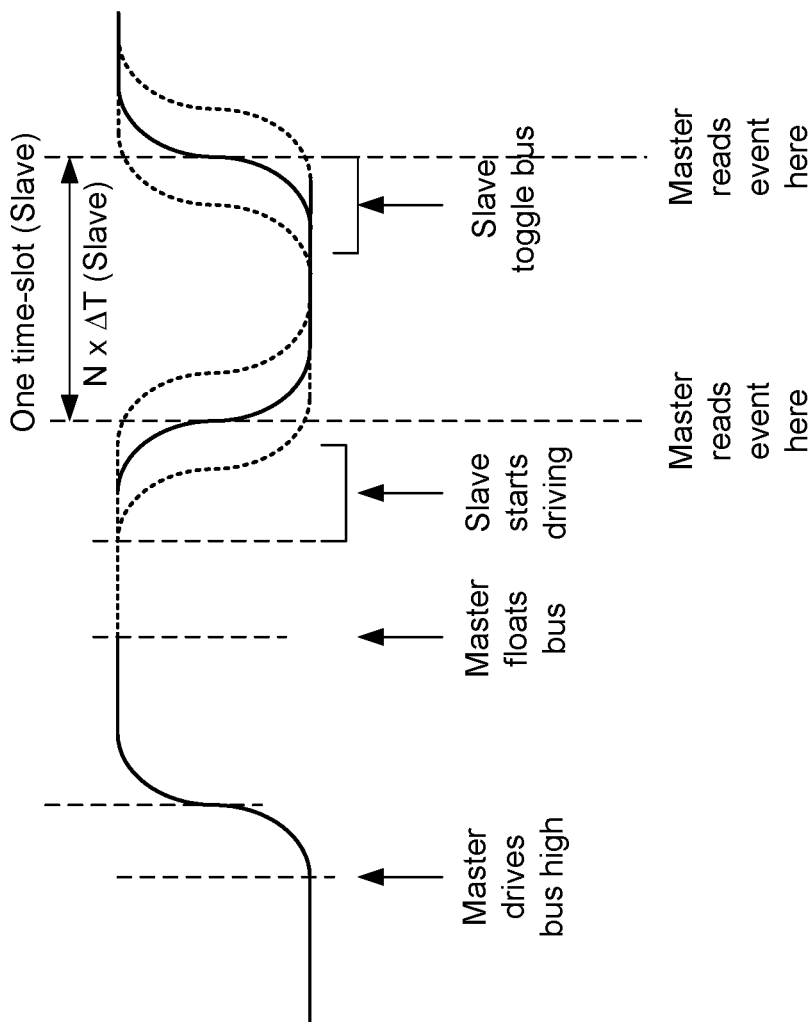
FIG. 18 is a timing diagram illustrating a master or slave device configured to read the delay for both falling and rising edges by performing two reads on alternate events, in accordance with one or more embodiments of the present disclosure.

FIG. 18 shows an example of a master device reading two slave device values, in accordance with one or more embodiments. Here the slave device will respond with both a falling and a rising transition. If the measurement of delays is based on unknown or uncalibrated time steps inside a slave device, this may be used to find out how many time-steps are required for a given time-unit, by finding the number or delays number between two settings. By dividing this value by two, we can find the number of delay units that is equal to half a clock period. Furthermore, this final method may allow the master device to get a measurement of both the rising and falling edge delays.

Figure 19:
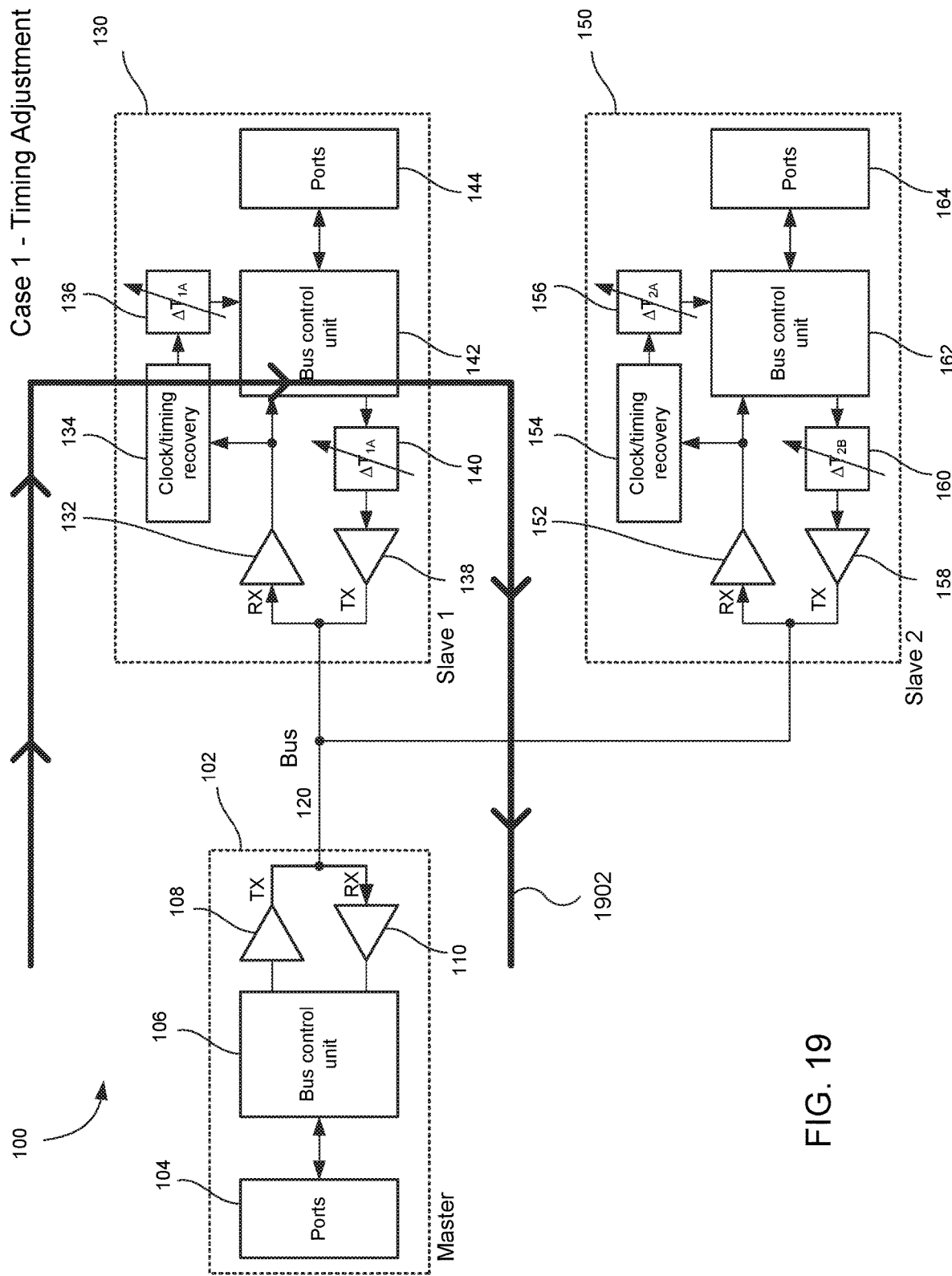
FIG. 19 is a block diagram illustrating a master device and two slave devices connected to a common bus, with delays inside the devices and on the bus itself, in accordance with one or more embodiments of the present disclosure.

As described herein, when a slave device changes a bus value and a master device reads and then reflects the value so that the slave device can adjust its bus write timing for optimal receive reliability, the system timing topology is essentially Case 1 in Table 2 and as identified by timing line 1902 in FIG. 19. FIG. 19 illustrates a master device and two slave devices connected to a common bus, with delays inside the devices and on the bus itself, in accordance with one or more embodiments of the present disclosure, and similar to system 100 of FIG. 1. This is the case for standard Slave to Master calibration.

Figure 20:
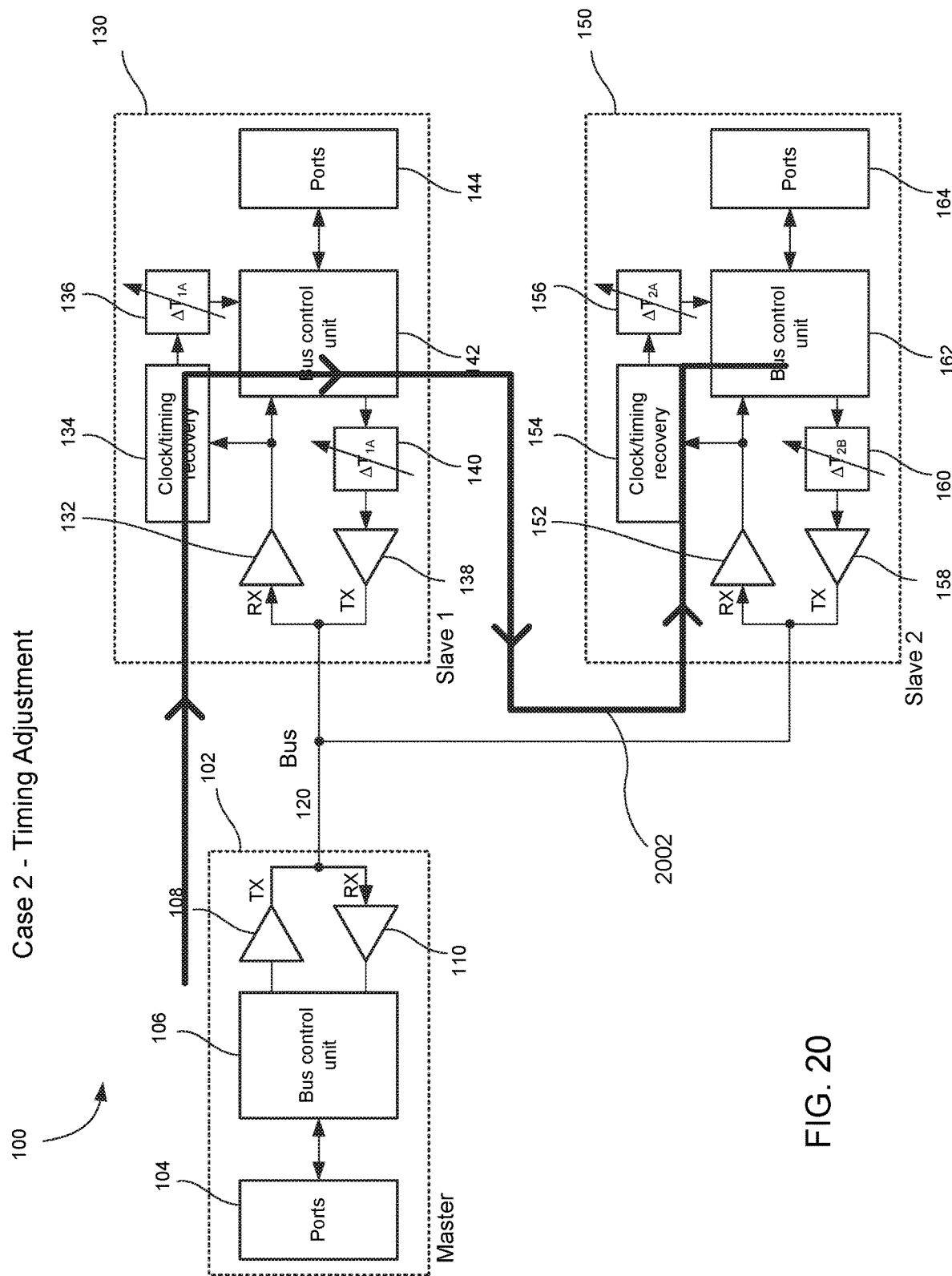
FIG. 20 is a block diagram illustrating a master device and two slave devices connected to a common bus, with delays inside the devices and on the bus itself, in accordance with one or more embodiments of the present disclosure.

If another slave device Slave 2 reflects a value it has read from a change of the bus state by Slave 1, then this slave-reflected value can be used to optimize the timing of writing from Slave 1 to Slave 2, employing the various processes for timing adjustment described herein. Such system timing topology is essentially Case 2 in Table 2 and as identified by timing line 2002 in FIG. 20.

Figure 21:
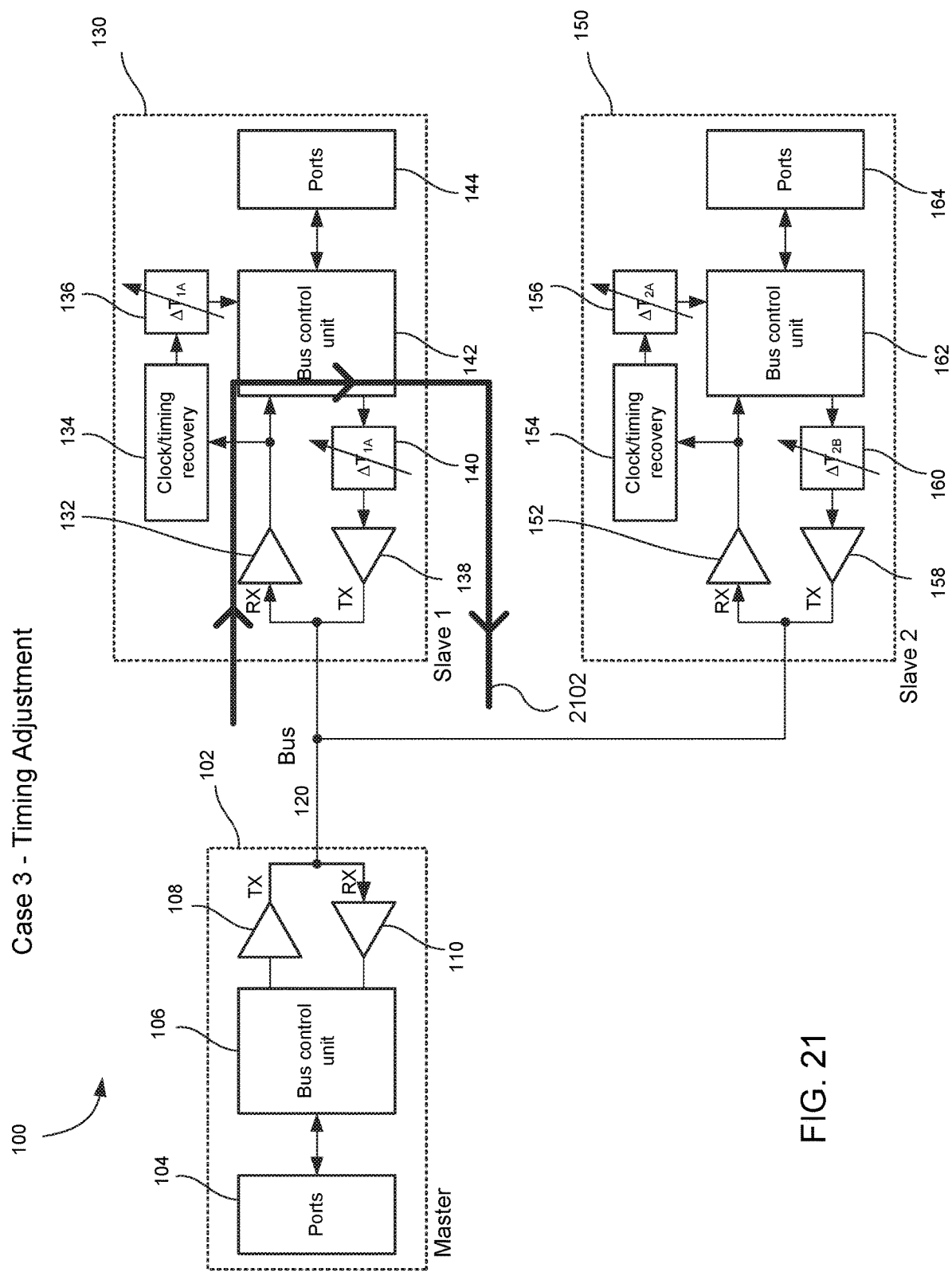
FIG. 21 is a block diagram illustrating a master device and two slave devices connected to a common bus, with delays inside the devices and on the bus itself, in accordance with one or more embodiments of the present disclosure.

If a slave device adapts its write time to its own output, it corrects for the inherent delay from its internal timing to the external observed output, and so its writes are aligned with a corresponding master device sync edge. This is so because its internal read logic will observe the same delay for both the master device sync signal and for the self-generated write value or signal. Thus, in this case the timing of the slave device will be very accurately aligned with the received master device timing without the requirement of expensive tuning/programming. Such system timing topology is essentially Case 3 in Table 2 and as identified by timing line 2102 in FIG. 21.

In Case 3, a Slave 1 device writes to the bus while at the same time reads back from the bus. This process is used to adjust the write timing of Slave 1 so that its output data are aligned with a synchronization pattern provided by the master device. This process may be used to correct for any internal timing differences between bus devices and assure outputs are aligned perfectly to the timing edges (real or virtual as provided by an internal timing division) provided by the master device. If multiple devices are located close to Slave 1, then it is possible to write to all such devices at the same time, without any correction of the devices, because the edges will be aligned with the master device timing and the other devices will receive data that has the same time reference. Case 4 in Table 2 is similar to Case 3 but focuses on the master device. If the receive timing inside the master has a fixed timing, the difference in transmit and receive timing can be corrected for by performing a procedure similar to Case 2 to obtain a perfect timing, e.g. for self-testing and collision testing. In various embodiments, Case 4 may be performed at the start-up of the bus, before a slave device is even attached to the bus, in order to save time/reduce time needed to complete full system timing calibration. The master device may use the initial 0-1 synchronization pulse to adjust the internal sampling point for reading from the bus. By adjusting the write timing and keeping the reading point fixed, it is possible to align the external 0-1 event with the reading point of the master device. This way, minute timing differences may be eliminated and, as a result, higher bus operation speeds are achievable. For example, both the sync and data from the master device may be time-shifted.

Figure 24A:
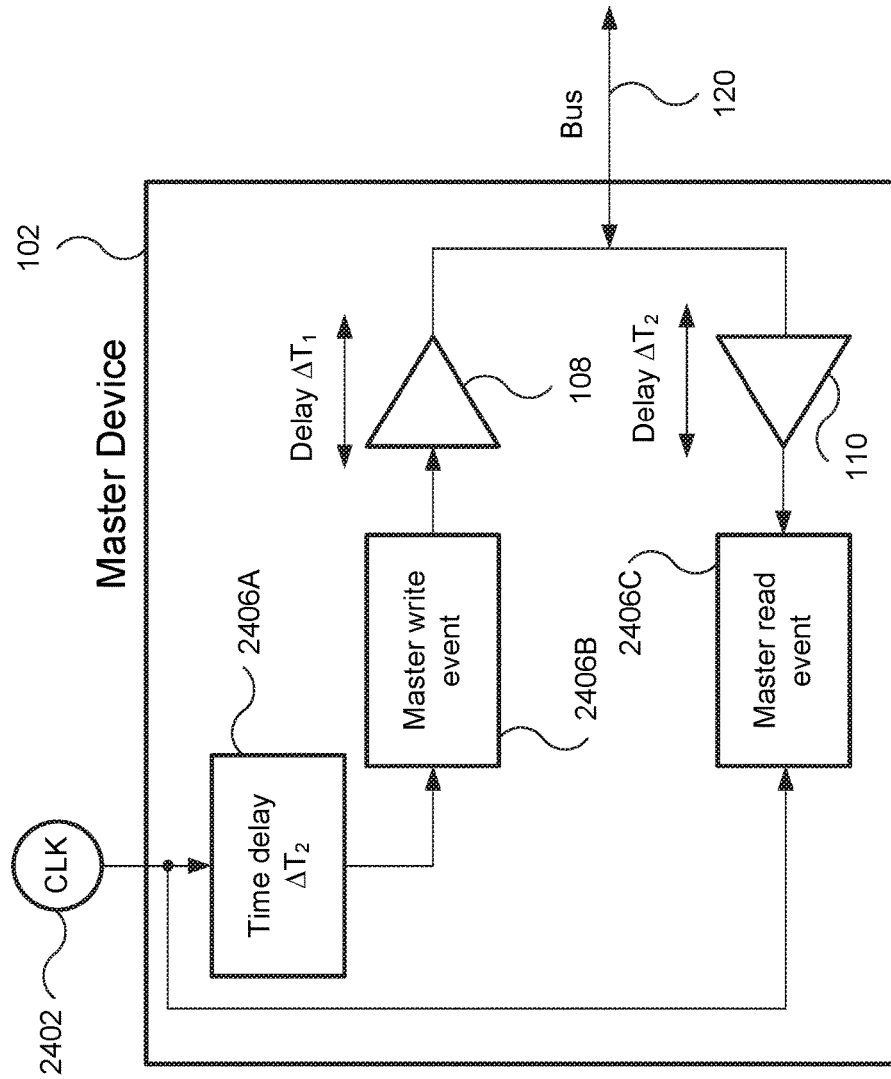
FIG. 24A is a block diagram illustrating a bus device connected to a common bus and including a write timing adjustment module, with delays inside the device and on the bus itself, in accordance with one or more embodiments of the present disclosure.

FIG. 24A is a block diagram illustrating a bus device (e.g., master device 102) connected to bus 120 and including a write timing adjustment module or logic 2406A, with intrinsic write delay $\Delta T_1$ associated with transmitter/output port 108 and intrinsic read delay $\Delta T_2$ associated with receiver/input port 110 inside the bus device, in accordance with one or more embodiments of the present disclosure. In FIG. 24A, master device 102 may be configured to adjust a write delay of master device 102 using write timing adjustment module 2406A to compensate for intrinsic read delay $\Delta T_2$ and properly align, with respect to bus communications timing, master write event 2406B and master read event 2406C, as described with respect to Case 4. In various embodiments, one or more of write timing adjustment module 2406A, master write event 2406B, and/or master read event 2406C may be implemented by and/or within bus control unit 106, as shown in FIG. 1. Similar timing adjustment modules may be implemented within any of the slave devices described herein.

The various Write Timing Adjustment cases are summarized in Table 1 below.

TABLE 2

| Case | Device to write | Device to reflect | Process | Result | Use case |
|---|---|---|---|---|---|
| 1 | Slave 1 | Master | Adjust Slave 1 write timing | Perfect alignment of Slave 1 timing when writing to Master | Optimize Slave to Master communication |
| 2 | Slave 1 | Slave 2 | Adjust Slave 1 write timing | Perfect alignment of Slave 1 timing when writing to Master | Optimize Slave to Slave communication |
| 3 | Slave 1 | Slave 1 (internal) | Adjust Slave 1 write timing | Slave 1 will have output aligned exactly with Master sync edge | Optimize Slave to multiple Slaves communication (close proximity, if read timing is not adjusted) |
| 4 | Master | Master (internal) | Adjust Master write timing | Correct for receive delay in Master | Collision testing, Master self-test, multi-device write |

Alternatively, or in addition to write timing adjustment, read timing adjustment may be performed. For read timing cases, the exact time a receive event occurs inside a slave device or master device will be corrected for by correcting for the corresponding receive timing. These cases will employ processes similar to the various processed described herein, but it is important to make sure that the change in timing happens in the correct way.

For example, a write timing adjustment algorithm may be modified so that if the last value showed a change (i.e. a proper read), the read time would be decreased (e.g., to get to the point where there is about 50% chance of zero and ones), and if there was no change of the bus value, read time would be increased. Put differently, where normally the write position would be increased, if a change is read all the time, then if instead the read position is adjusted, the read delay would be decreased (i.e. an opposite adjustment).

In Case 5 of Table 3, the read time of the master device is adjusted based on the value provided by Slave 1. Because the internal delay of the exact read event is adjusted inside the master device, it is not necessary to reflect the read value back to the bus because the master device already has the information that it needs for read delay adjustment. In this respect, this read timing adjustment will only require half the bandwidth as compared to write timing adjustment. Thus, while earlier descriptions used two rows for each adjustment step (slave device writes to bus, next row the master device writes back the written value), it is possible to perform this read adjustment in a single row.

Figure 22:
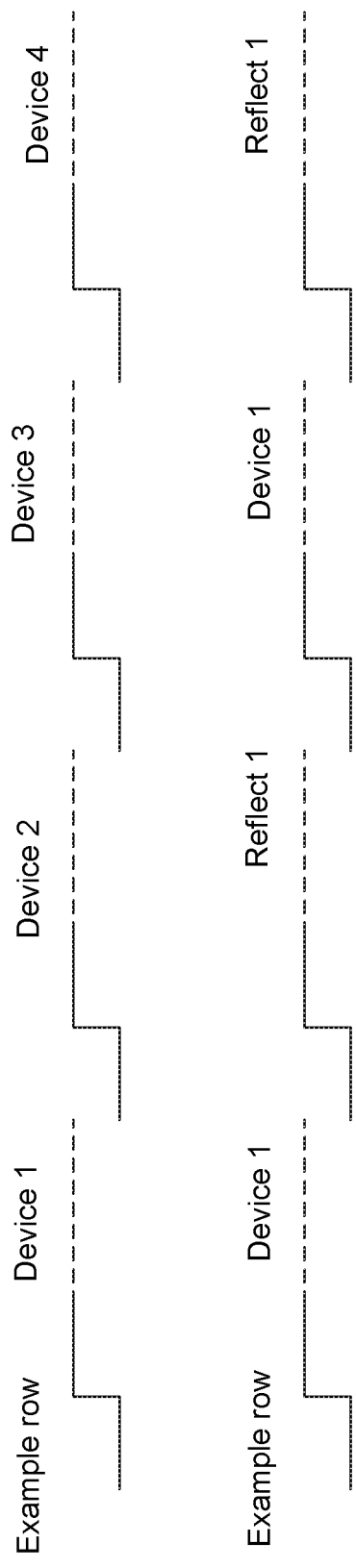
FIG. 22 illustrates an example calibration timing for a bus system including a master device and two slave devices connected to a common bus, with delays inside the devices and on the bus itself, in accordance with one or more embodiments of the present disclosure.

In some embodiments, Case 5 and Case 6 of Table 3 may be combined into a single read adjustment with all devices adjusting their read delay timing at the same time. This is possible because the attached devices that read from Slave 1 can adjust their read timing based on their own previous read value. Thus, multiple devices can adjust their timing at the same time without an increase in the time to complete the procedure. The only practical limitation is that the slowest device on the bus will determine the total adjustment time. For Case 6, the read timing of a slave device Slave 2 is adjusted while the bus is changed by Slave 1. Because Slave 2 reads the value from the bus and uses this value to adjust its read timing (i.e. try to achieve around 50% zeros and ones), it is not necessary for Slave 2 to write back the value read from the bus. FIG. 22 illustrates the differences between read timing calibrations and write timing calibrations, where in the top row each device can write and read within the same data row to calibrate read timings, and where in the bottom row each device requires a reflection in order to calibrate write timings.

For Case 7, the master device will adjust its own receive timing, so that it is perfectly aligned with its own transmit timing. This may be used to correct for delays inside the master device and for the master device to be used as a part of a group write, where all members of the group have adjusted their internal timing to the output from the master device. This way, the master device will not need a clock recovery circuit to obtain perfect receive timing. In various embodiments, Case 7 may be performed at the start-up of the bus, before a slave device is even attached to the bus, in order to save time/reduce time needed to complete full system timing calibration. The master device may use the initial 0-1 synchronization pulse to adjust the internal sampling point for reading from the bus. By adjusting the read timing and keeping the write time fixed, it is possible to align the external 0-1 event with the reading point of the Master. This way, minute timing differences may be eliminated and, as a result, higher bus operation speeds are achievable.

Figure 24B:
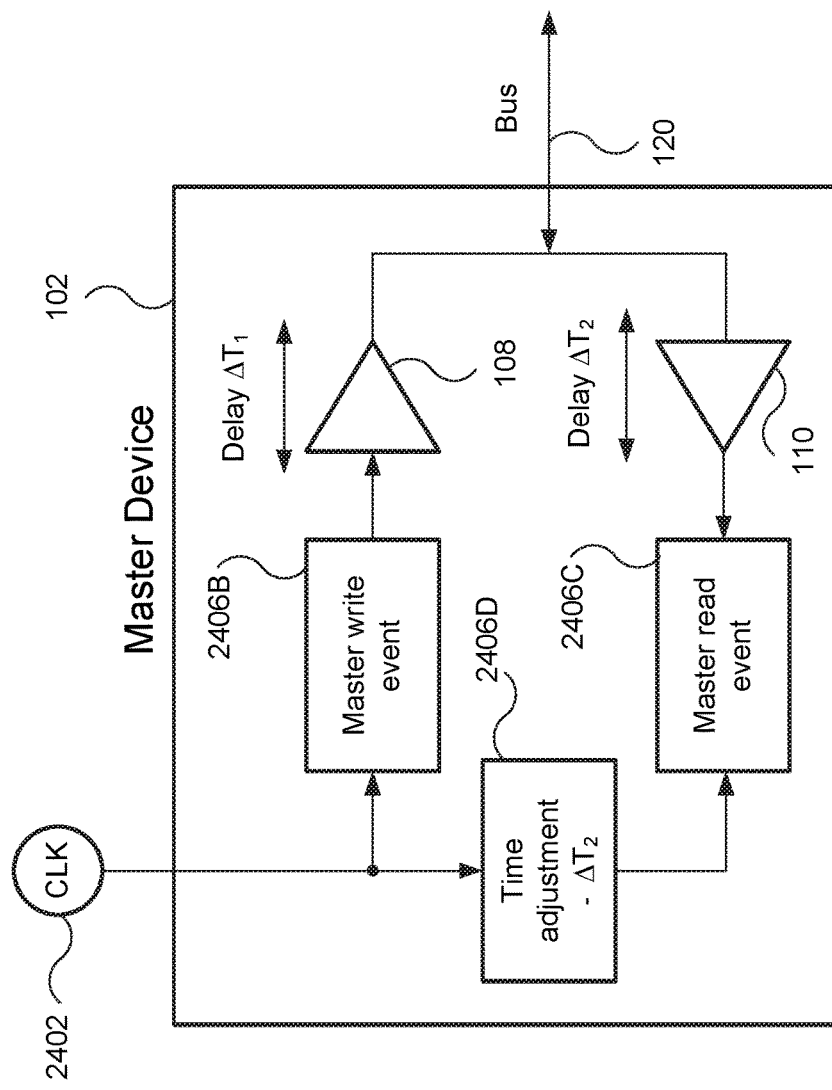
FIG. 24B is a block diagram illustrating a bus device connected to a common bus and including a read timing adjustment module, with delays inside the device and on the bus itself, in accordance with one or more embodiments of the present disclosure.

FIG. 24B is a block diagram illustrating a bus device (e.g., master device 102) connected to bus 120 and including a read timing adjustment module or logic 2406D, with intrinsic write delay $\Delta T_1$ associated with transmitter/output port 108 and intrinsic read delay $\Delta T_2$ associated with receiver/input port 110 inside the bus device, similar to the intrinsic delays described in FIG. 24A with respect to Case 4. In FIG. 24B, master device 102 may be configured to adjust a read delay of master device 102 using read timing adjustment module 2406A to compensate for intrinsic write delay $\Delta T_2$ and properly align, with respect to bus communications timing, master write event 2406B and master read event 2406C, as described with respect to Case 7. In various embodiments, one or more of read timing adjustment module 2406D, master write event 2406B, and/or master read event 2406C may be implemented by and/or within bus control unit 106, as shown in FIG. 1. Similar timing adjustment modules may be implemented within any of the slave devices described herein.

For Case 8, a slave device adjusts its own receive timing to be aligned with the master device sync pulse. This is typically not necessary or relevant for system timing, because sync and data are already aligned in this direction (sync and data are delayed equally).

TABLE 3

| Case | Device to write | Device to adjust | Process | Result |
|---|---|---|---|---|
| 5 | Slave 1 | Master, adjust internally to the read value | Adjust Master read timing | Perfect alignment when Master reads from Slave 1 |
| 6 | Slave 1 | Slave 2, adjust internally to the read value | Adjust Slave 2 read timing | Perfect alignment when Slave 2 reads from Slave 1 |
| 7 | Master | Master, adjust internally to the read value | Adjust Master read timing | Perfect alignment when Master reads its own output |
| 8 | Master | Slave, adjust internally to the read value | Adjust Slave read timing | Not relevant, we already have an accurate time reference (zero offset). |

General system timing adjustments may proceed as follows. For the general case of single Slave 1 writing to multiple devices (2-N), first the Slave 1 write timing is optimized to align with the master device timing (Case 3) to preserve bandwidth, and second the read timing for devices 2-N (Case 5-6) is optimized. For simple configurations, Case 1-2 will cover all scenarios and offer perfect alignment. In cases with long cable delays, it may be necessary to write to a later time-slot to avoid collisions between out-going and returned signals. As an alternative, longer time-slots may be used when communicating with multiple devices simultaneously. In cases where the reflection value is internal, it is not required to insert an extra row in a command sequence. This will make the adaption process faster.

In additional embodiments, general system timing adjustments may include performing Cases 1, 6, and 7, according to various different orders of operation. For example, in one embodiment, system 100 may perform Case 7, where a master device will adjust its own receive or read timing so as to be perfectly aligned with its own transmit timing. In some embodiments, this may be performed substantially simultaneously, or prior to, system 100 performing Case 1, where a slave device changes a bus value and a master device reads and then reflects the value so that the slave device can adjust its bus write or transmit timing, as described herein. In various embodiments, system 100 may then perform Case 6 and/or Case 8 to adjust all other slave device read timings. In some further embodiments, system 100 may perform embodiments of Cases 2 and/or 3 to adjust all slave device write and read timings (e.g., transmit and receive timings) without necessitating any master device read/write timing adjustments at all, or to minimize master device read/write timing adjustments (e.g., to minimize time needed for dynamic recalibration of system 100 when a new slave device attempts to participate in bus communications after a master device and multiple slave devices have already settled on respective read/write timings).

More generally, any one or more of Cases 1-8 may be performed in any order or combination by embodiments of system 100 to provide dynamic write and read calibration for bus communications between bus-connected devices supported by and/or over bus 120 of system 100, as described herein. In various embodiments, such timing adjustments may include identification and selection of appropriate time slots (e.g., as shown in FIG. 4) to facilitate timing calibration within the achievable range of each device (e.g., master or slave) coupled communicatively over bus 120. Moreover, such timing adjustments may be performed using any of the processes and/or algorithms identified herein, which may be modified to adjust read timing and/or write timing, as described herein.

Figure 23:
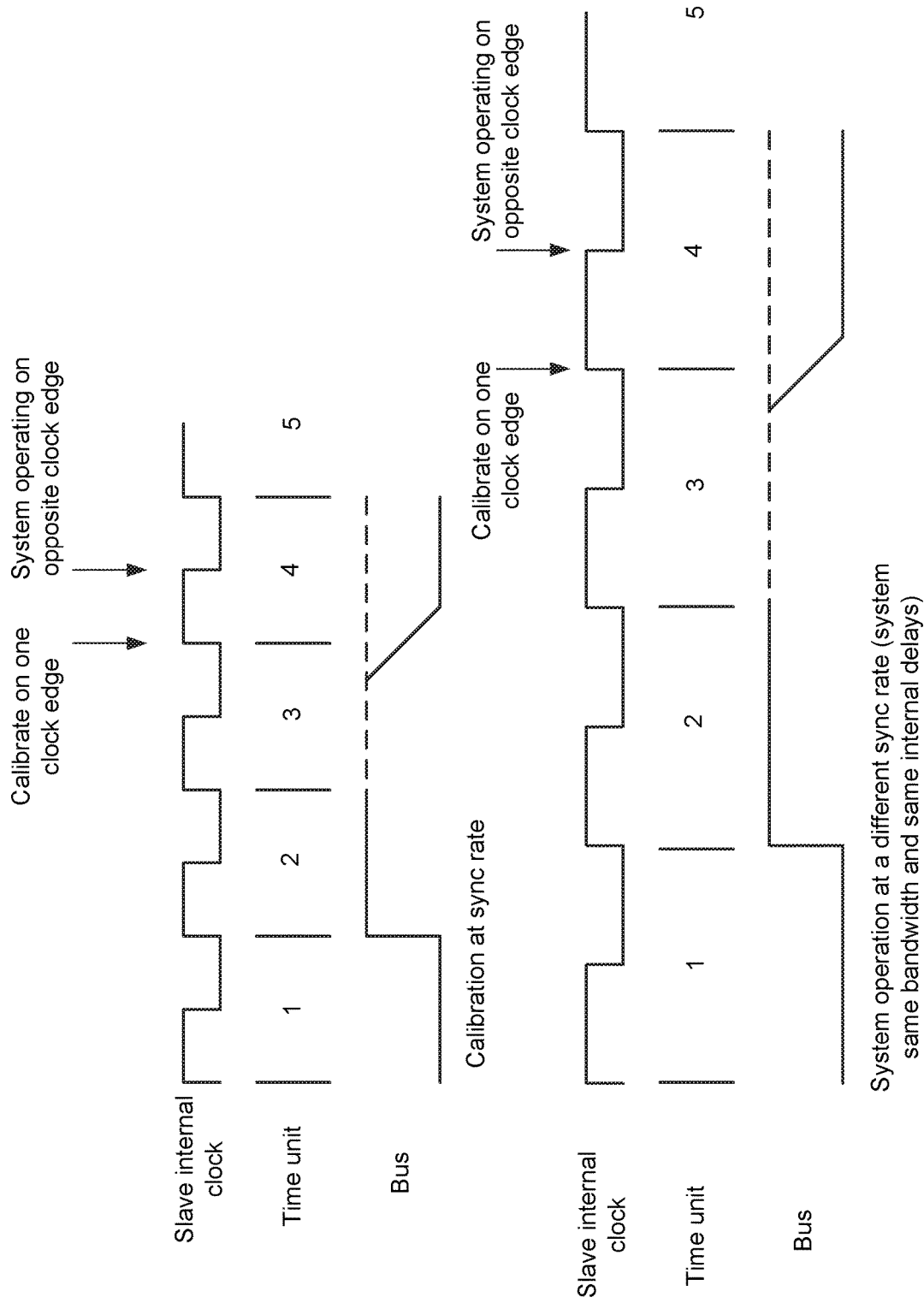
FIG. 23 illustrates an example calibration timing for a bus system including a master device and two slave devices connected to a common bus implementing two different clock or sync rates, with delays inside the devices and on the bus itself, in accordance with one or more embodiments of the present disclosure.

In some embodiments, it may be desirable that the clock rate for the bus be adjustable. As long as the bandwidth of the circuits used for transmit and receive, and thereby the internal delays, stays the same, a new timing calibration is not needed. The general principle is to adjust on one clock edge during calibration and read on the next clock edge for normal operation to ensure a perfect receive eye pattern. If the internal delays change slightly during a change in sync/clock rate, the calibration accuracy will be reduced and, in some cases, a recalibration may be necessary if the changes in internal delays are too great. Otherwise, the same calibration values may be used. For example, FIG. 23 illustrates an example calibration timing for a bus system including a master device and two slave devices connected to a common bus implementing two different clock or sync rates, with delays inside the devices and on the bus itself, in accordance with one or more embodiments of the present disclosure.

It is possible to let the bus start up in a native pulse density modulation (PDM) mode. This will ensure backwards compatibility with PDM. In some embodiments, it is possible to include a differential voltage detection algorithm configured to detect differential data and change from single-ended standard PDM mode (without direct programming allowed except for a change in clock frequency) to differential mode. Similarly, it is possible for an interface to start in differential mode, and when a single-ended standard PDM signal is detected, the interface changes to single ended mode. Such change may also happen with use of certain time-constants that change between these two modes of operation when a signal is kept at a certain level for a certain amount of time or by duty-cycle modulation of the clock or data line.

In particular embodiments, a system may include a third single-ended mode that includes programming, such as available with controlled PDM (PDM+) systems. The change between the three modes (backwards compatible PDM, programmable PDM, and differential) may happen by programming of the clock and data lines. In various embodiments, a differential mode of operation may be used for low EMI, and a backwards compatible PDM mode may be used to ensure there is a backup mode for general systems and/or bus connected devices.

In some embodiments, system 100 may be configured to use a special synchronization word to perform timing calibrations. When such special synchronization words are used, particular care is necessary in order that the transmitted commands do not interfere with the chosen synchronization word(s). Thus, during execution of a calibration command, the following responses are available: (1) a test value—unknown value and not controllable; (2) a reflected value—unknown value but controllable (reflects what is read); (3) an optional known value that is controllable—this value may be inserted in a sequence of reads to avoid generating the special synchronization value.

In general, care should be taken to ensure that the known value (2) and controllable value (3) will not generate the synchronization word when used together. Because value (3) is controlled, it is possible to always ensure the synchronization word is not generated, as long as the length of the synchronization word is longer than at least two bits. For the special reading by a device from itself or for the read delay adjustment, value (2) will normally not be sent out, which should be taken into account when controlling the value (3).

Where applicable, various embodiments provided by the present disclosure may be implemented using hardware, software, or combinations of hardware and software. Also, where applicable, the various hardware components and/or logic components set forth herein may be combined into composite components comprising software, hardware, and/or both without departing from the scope of the present disclosure. Where applicable, the various hardware components and/or logic components set forth herein may be separated into sub-components comprising software, hardware, or both without departing from the scope of the present disclosure. In addition, where applicable, it is contemplated that software components may be implemented as hardware components and vice versa.

The foregoing disclosure is not intended to limit the present disclosure to the precise forms or particular field of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An internal delay correction circuit, comprising:
   an input connected with a line of a bus, wherein the line of the bus is used for time-multiplexed clock and data communication;
   a time-gate that filters data traffic on the line of the bus from synchronization pulses;
   a plurality of delay cells;
   a bus synchronization circuit that controls the plurality of delay cells;
   a multiplexer that is used to control output timing using the plurality of delay cells; and
   an output connected with the line of the bus, wherein the output timing controlled by the multiplexer controls timing of data output via the output.

2. The internal delay correction circuit of claim 1, further comprising:

an input buffer that receives the input connected with the line of the bus and connects with the time-gate.

3. The internal delay correction circuit of claim 2, further comprising:
an output buffer that receives an output of the multiplexer and outputs the data to the line of the bus.

4. The internal delay correction circuit of claim 3, further comprising:
a transmit register that contains a next piece of data to be transmitted by the output buffer to the line of the bus.

5. The internal delay correction circuit of claim 1, wherein:
the internal delay correction circuit is part of a slave device;
a master device external to the slave device controls a setting of the multiplexer via the bus; and
the setting of the multiplexer controls the output timing.

6. The internal delay correction circuit of claim 1, wherein:
the internal delay correction circuit is part of a slave device;
the slave device controls a setting of the multiplexer; and
the setting of the multiplexer controls the output timing.

7. The internal delay correction circuit of claim 1, wherein delay cells of the plurality of delay cells are connected in series.

8. The internal delay correction circuit of claim 7, wherein:
an output of each delay cell of the plurality of delay cells is connected with the multiplexer; and
the multiplexer is configured to select an output of one delay cell of the plurality of delay cells for use in controlling the output timing.

9. The internal delay correction circuit of claim 7, wherein the plurality of delay cells are part of a programmable delay line with a plurality of taps.

10. A system for performing bus communications, comprising:
a bus;
a master device connected with a line of the bus, wherein the line of the bus is used for time-multiplexed clock and data communication;
a first slave device connected with the line of the bus, the first slave device comprising a circuit for performing delay correction, the circuit comprising:
an input connected with the line of the bus;
a time-gate that filters data traffic on the line of the bus from synchronization pulses;
a plurality of delay cells;
a bus synchronization circuit that controls the plurality of delay cells;
a multiplexer that is used to control output timing using the plurality of delay cells; and
an output connected with the line of the bus, wherein the output timing controlled by the multiplexer controls timing of data output via the output.

11. The system of claim 10, the circuit further comprising:
an input buffer that receives the input connected with the line of the bus and connects with the time-gate.

12. The system of claim 11, the circuit further comprising:
an output buffer that receives an output of the multiplexer and outputs data to the line of the bus.

13. The system of claim 12, the circuit further comprising:
a transmit register that contains a next piece of data to be transmitted by the output buffer to the line of the bus.

14. The system of claim 10, wherein:
the master device controls a setting of the multiplexer via the bus; and
the setting of the multiplexer controls the output timing.

15. The system of claim 10, wherein:
the first slave device controls a setting of the multiplexer; and
the setting of the multiplexer controls the output timing.

16. The system of claim 10, wherein delay cells of the plurality of delay cells of the circuit are connected in series.

17. The system of claim 16, wherein:
an output of each delay cell of the plurality of delay cells is connected with the multiplexer; and
the multiplexer is configured to select an output of one delay cell of the plurality of delay cells for use in controlling the output timing.

18. The system of claim 10, further comprising a second slave device, wherein the line of the bus is additionally connected with the second slave device.

19. The system of claim 10, wherein the system is configured to adjust the output timing of the first slave device using the circuit in response to startup of the system.

20. The system of claim 10, wherein the system is configured to adjust the output timing of the first slave device on a continuous basis to correct for environmental changes.

* * * * *